US012285913B2

(12) United States Patent
Goldman et al.

(10) Patent No.: US 12,285,913 B2
(45) Date of Patent: Apr. 29, 2025

(54) USE OF DYE-TYPE POLARIZERS IN A PHOTOPOLYMER CURING DEVICE

(71) Applicant: Formlabs Inc., Somerville, MA (US)

(72) Inventors: Andrew Goldman, Stow, MA (US); Hayley Whelan, Cambridge, MA (US); Henry Whitney, Weymouth, MA (US); Maxim Lobovsky, Cambridge, MA (US); Mehmet Dogan, Woburn, MA (US)

(73) Assignee: Formlabs Inc., Somerville, MA (US)

( * ) Notice: Subject to any disclaimer, the term of this patent is extended or adjusted under 35 U.S.C. 154(b) by 218 days.

(21) Appl. No.: 17/813,771

(22) Filed: Jul. 20, 2022

(65) Prior Publication Data

US 2023/0150200 A1    May 18, 2023

Related U.S. Application Data

(60) Provisional application No. 63/266,733, filed on Jan. 13, 2022, provisional application No. 63/263,950, filed on Nov. 12, 2021.

(51) Int. Cl.
*B33Y 10/00*    (2015.01)
*B29C 64/129*    (2017.01)
(Continued)

(52) U.S. Cl.
CPC .......... *B29C 64/286* (2017.08); *B29C 64/129* (2017.08); *B33Y 10/00* (2014.12);
(Continued)

(58) Field of Classification Search
CPC ..... B29C 64/286; B29C 64/129; B33Y 10/00;
B33Y 30/00; C08J 5/18; C08J 2329/04;
C08K 5/235; C09B 67/0063; G02F
1/133528; G02F 1/133603; G02F
1/133607; G02F 1/133617; G02F
1/13362; G02B 5/3033; G02B 5/305;
G02B 5/3058
See application file for complete search history.

(56) References Cited

U.S. PATENT DOCUMENTS

2016/0161799 A1    6/2016    Morishima
2018/0136514 A1    5/2018    Van Esbroeck
2022/0137452 A1*   5/2022    Duoss ............... B33Y 30/00
                                                          349/96

FOREIGN PATENT DOCUMENTS

CN    104669619 A  *  6/2015
CN    106363909 A  *  2/2017    ............. B33Y 30/00
(Continued)

OTHER PUBLICATIONS

English Machine Translation of Hou CN-104669619-A (Year: 2024).*
(Continued)

*Primary Examiner* — Donald L Raleigh
(74) *Attorney, Agent, or Firm* — Michael J. Attisha;
Greenberg Traurig, LLP

(57) ABSTRACT

A curing system for an additive fabrication system includes a light source, a liquid crystal cell, and a first polarizer. The light source is configured to emit light at a wavelength suitable for curing a material. The liquid crystal cell is configured to receive the light from the light source. The first polarizer comprises a polyvinyl alcohol (PVA) matrix and organic dyes impregnated into the PVA matrix.

20 Claims, 14 Drawing Sheets

(51) Int. Cl.
*B29C 64/286* (2017.01)
*B33Y 30/00* (2015.01)
*C08J 5/18* (2006.01)
*C08K 5/23* (2006.01)
*C09B 67/20* (2006.01)
*G02F 1/1335* (2006.01)
*G02F 1/13357* (2006.01)

(52) U.S. Cl.
CPC .............. *B33Y 30/00* (2014.12); *C08J 5/18* (2013.01); *C08K 5/235* (2013.01); *C09B 67/0063* (2013.01); *G02F 1/133528* (2013.01); *G02F 1/133603* (2013.01); *G02F 1/133607* (2021.01); *G02F 1/133617* (2013.01); *G02F 1/13362* (2013.01); *C08J 2329/04* (2013.01)

(56) References Cited

FOREIGN PATENT DOCUMENTS

| CN | 109188757 A | * | 1/2019 | ........... B29C 64/129 |
|---|---|---|---|---|
| CN | 109483886 A | * | 3/2019 | ........... B29C 64/264 |
| CN | 113561488 | † | 10/2021 | |
| JP | 2001-311823 | † | 11/2001 | |
| JP | 2002-357719 | † | 12/2002 | |
| JP | 2003-025455 | † | 1/2003 | |
| JP | 2003-035819 | † | 2/2003 | |
| JP | 4599576 B2 | | 12/2010 | |
| JP | 2018-521341 | † | 8/2018 | |
| JP | 2021-074900 | † | 5/2021 | |
| TW | 202027997 A | * | 8/2020 | ............. B32B 27/08 |

OTHER PUBLICATIONS

English Machine Translation of Chen CN-106363909-A (Year: 2024).*

English Machine Translation of Xia CN-109483886-A (Year: 2024).*

English Machine Translation of Jang TW-202027997-A (Year: 2024).*

English Machine Translation of Han et al , CN 109188757, (Year: 2024).*

International Search Report and Written Opinion, relating to application No. PCT/US2022/073935, dated Oct. 20, 2022.

\* cited by examiner
† cited by third party

USE OF DYE-TYPE POLARIZERS IN A PHOTOPOLYMER CURING DEVICE

CROSS-REFERENCE TO RELATED APPLICATIONS

This U.S. non-provisional patent application claims priority under 35 U.S.C. § 119(e) to U.S. provisional application 63/263,950 filed on Nov. 12, 2021 and to U.S. provisional patent application 63/266,733 filed on Jan. 13, 2022, the disclosures of which are considered part of the disclosure of this application and are hereby incorporated by reference in their entireties.

TECHNICAL FIELD

This disclosure relates to a liquid crystal panel with enhanced polarizers for use in an additive fabrication system.

BACKGROUND

Additive fabrication, e.g., three-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a build surface upon which the object is built.

In one approach to additive fabrication, known as stereolithography, solid objects are created by successively forming thin layers of a curable polymer resin, typically first onto a build surface and then one on top of another. Exposure to actinic radiation cures a thin layer of liquid resin, which causes it to harden and adhere to a bottom surface of the build surface or a previously cured layer on the bottom surface of the build surface.

Stereolithography printers generally contain a vat of photocurable resin that can be cured when the resin interacts with light, usually in the near ultraviolet (UV) wavelength (e.g., 365-415 nm), predominantly at 405 nm. Historically, lasers were used for light delivery, but in recent years, area projection technologies such as digital light processing (DLP) and liquid crystal display (LCD) have been used for light delivery. LCD optical systems consist of a UV backlight which transmits light through an LCD screen from the display industry. The LCD screen is used as a spatial mask layer by layer to trace out the geometry of each layer of the component to be printed.

SUMMARY

An aspect of the disclosure provides a curing system for an additive fabrication system. The curing system includes a light source, a liquid crystal cell, and a first polarizer. The light source is configured to emit light at a wavelength suitable for curing a photopolymerizable material. The liquid crystal cell is configured to receive the light from the light source. The first polarizer is disposed between the light source and the liquid crystal cell, wherein the first polarizer includes a polyvinyl alcohol (PVA) matrix and an organic dye impregnated into the PVA matrix.

This aspect of the disclosure may include one or more of the following optional features. In some examples, the wavelength of the light source is between 365 nm and 415 nm. In some examples, the light source is configured to provide a flux greater than 20 mW/cm$^2$ at the first polarizer. In some implementations, the light source is configured to provide a flux greater than 2 mW/cm$^2$ at the photopolymerizable material. In some configurations, the first polarizer is configured to operate at a temperature range from 10 to 120 degrees Celsius.

Optionally, the organic dye comprises at least one dye made from one or more of metal diazo compounds, trisazo compounds, biphenyldiazo, trisazo or disazomonoazoxy compounds, or metal-containing biphenyldisazo, trisazo or disazomonoazoxy compounds. In some examples, the first polarizer is spaced apart from the liquid crystal cell by a first distance. In some implementations, the first polarizer is laminated to the liquid crystal cell. In some configurations, the first polarizer is configured to be decoupled from the curing system.

In some examples, the light source comprises a high-power light emitting diode. In some implementations, a light-receiving surface of the liquid crystal cell has a size equal to or greater than a size of a light-emitting surface of the first polarizer.

In some configurations, the system further includes a collimating lens between the light source and the first polarizer. In some implementations, the system includes a diverging lens between the first polarizer and the liquid crystal cell.

In some configurations, the system includes a second polarizer situated on an opposite side of the liquid crystal cell compared to the first polarizer. In some examples, the second polarizer includes a PVA matrix and an organic dye impregnated into the PVA matrix. In some configurations, the second polarizer is spaced apart from the liquid crystal cell by a second distance. In some implementations, the second polarizer is laminated on the liquid crystal cell. In some examples, the second polarizer is configured to be decoupled from the curing system.

Another aspect of the disclosure provides a method of additive fabrication for curing a photopolymerizable material. The method includes a light source configured to emit light at a wavelength suitable for curing the photopolymerizable material. The light is received at a liquid crystal cell and polarized at a first polarizer disposed between the light source and the liquid crystal cell. The first polarizer includes a polyvinyl alcohol (PVA) matrix and an organic dye impregnated into the PVA matrix. In some examples, the method includes polarizing the light at a second polarizer disposed on an opposite side of the liquid crystal cell as the first polarizer. The second polarizer includes a polyvinyl alcohol (PVA) matrix and an organic dye impregnated into the PVA matrix.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

The present disclosure relates to a curing system for an additive fabrication device (i.e., a 3D printer) that incorporates a liquid crystal panel configured to emit unfiltered monochromatic light to transform a liquid photopolymer resin into a solid layer of a fabricated component. Unlike conventional additive fabrication systems, which may include curing systems having lasers or DLP projectors, the curing system of the present disclosure includes the liquid crystal panel disposed adjacent to a basin that holds the liquid photopolymer resin to be cured. The liquid crystal panel is configured to emit unfiltered monochromatic light to the photopolymer resin within the basin at an optimal wavelength for curing the photopolymer resin. Using a liquid crystal panel according to the present disclosure offers the advantages over conventional laser and DLP curing systems, such as providing a high-resolution (e.g., up to 7,680×4,320 pixels) dimensional grid with a minimized optical path between the liquid crystal panel and the fabricated layer of the component. Reducing the optical path minimizes potential thermal drift between the curing system and the resin within the basin, ensuring a more precise definition of the fabricated part.

Figure 1A:
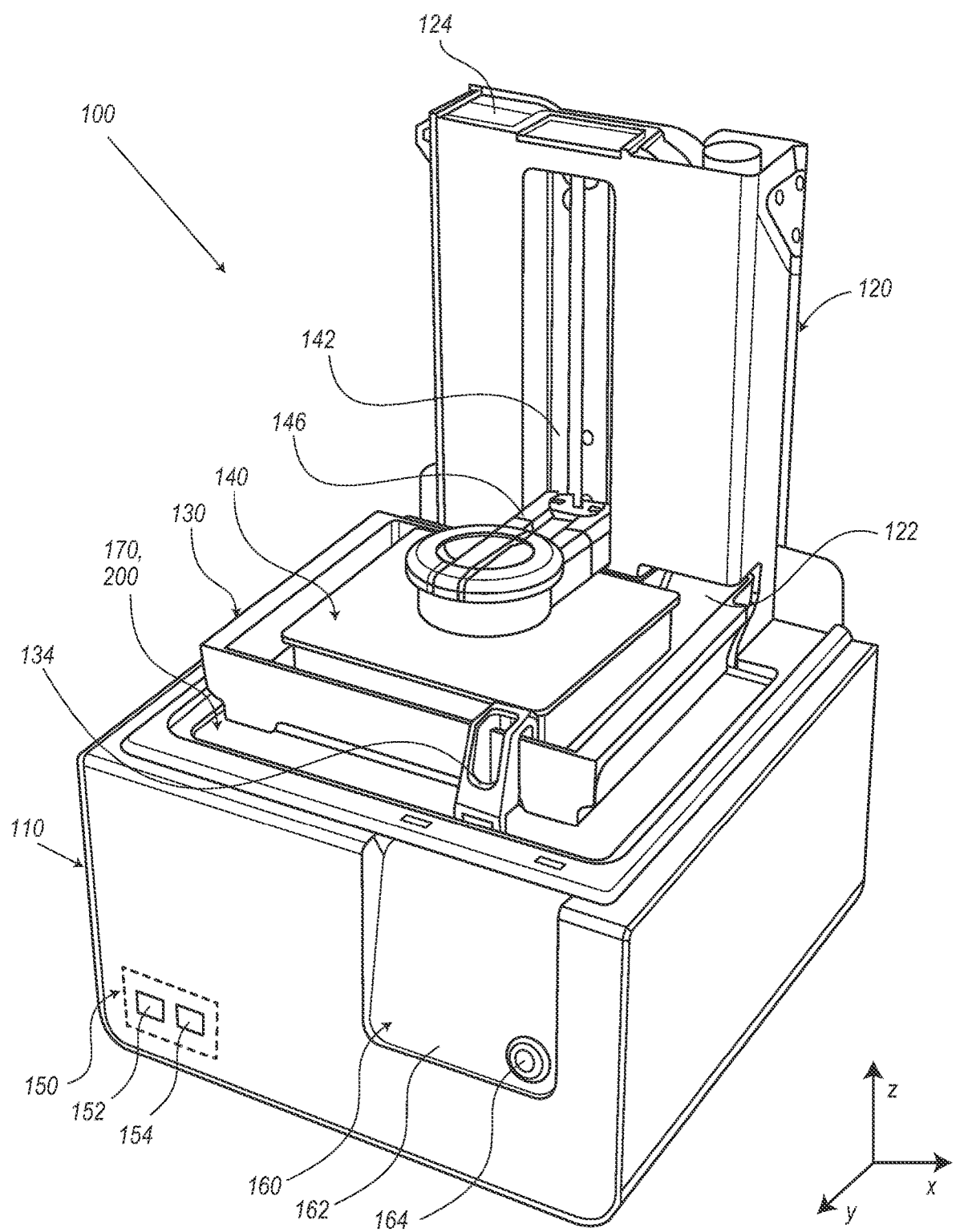
FIG. 1A shows a perspective view of an example additive fabrication system, where the system is arranged in an initial configuration.
Figure 1B:
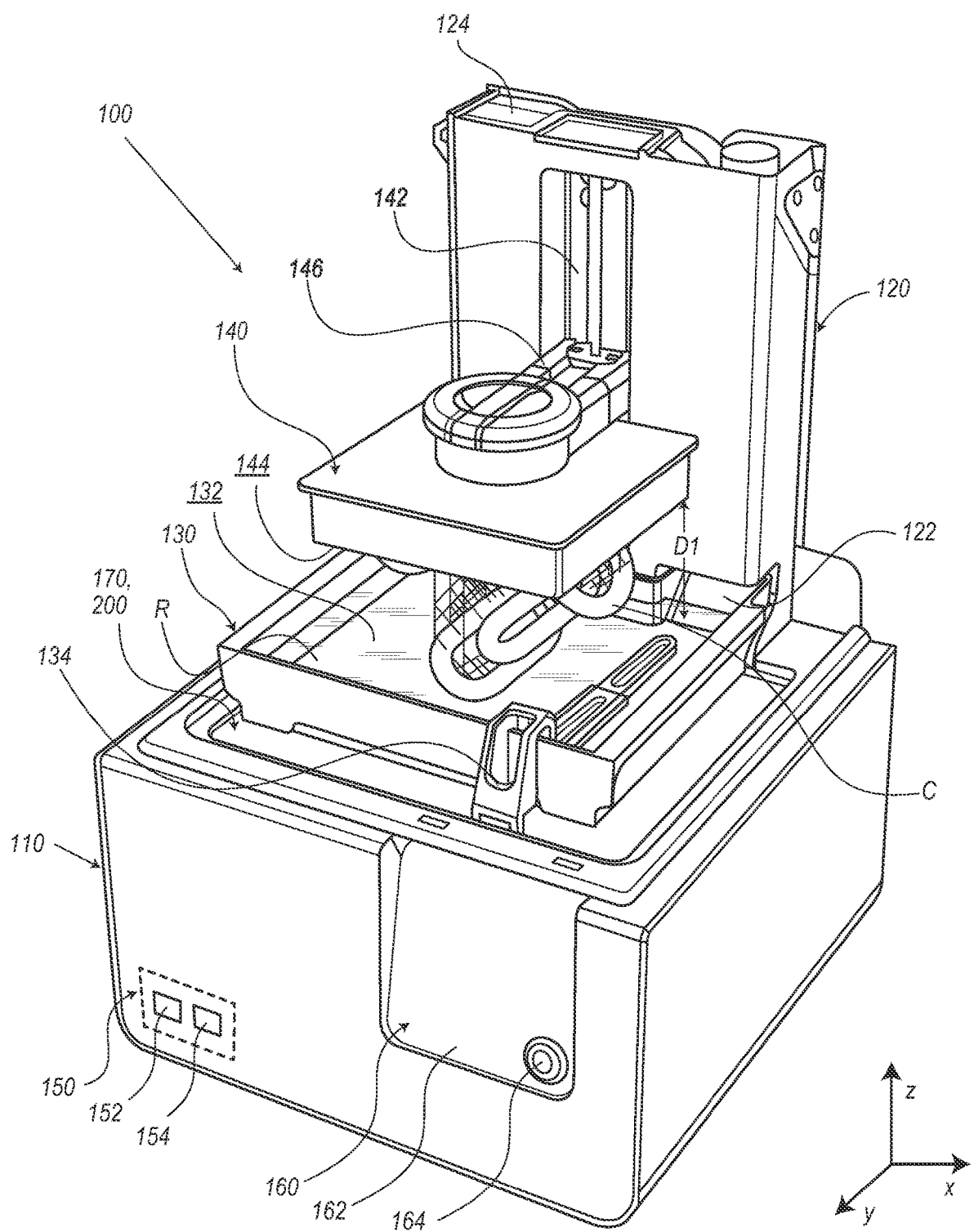
FIG. 1B shows a perspective view of an example additive fabrication system, where the system is arranged in a fabricating configuration.
Figure 1C:
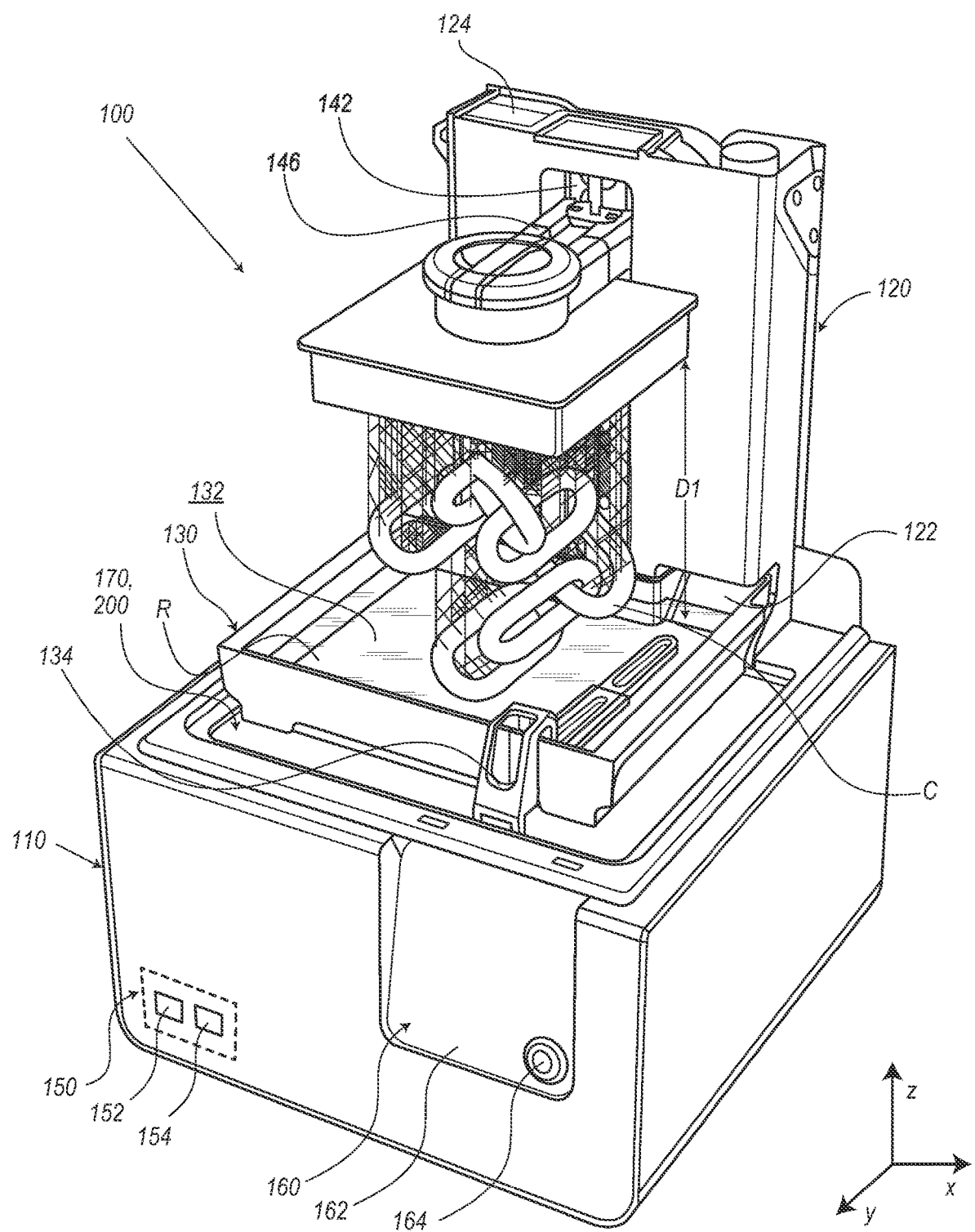
FIG. 1C shows a perspective view of an example additive fabrication system, where the system is arranged in a finished configuration.

Referring to FIGS. 1A-1C, an additive fabrication device 100, such as a stereolithographic printer, includes a base 110 and a dispensing system 120 coupled to the base 110. The base 110 supports a fluid basin 130 configured to receive a photopolymer resin from the dispensing system 120. The printer 100 further includes a build platform 140 positioned above the fluid basin 130 and operable to traverse a vertical axis (e.g., z-axis) between an initial position (FIG. 1A) adjacent to a bottom surface 132 of the fluid basin 130 and a finished position (FIG. 1C) spaced apart from the bottom surface 132 of the fluid basin 130.

The base 110 of the printer 100 may house various mechanical, optical, electrical, and electronic components operable to fabricate objects using the device. In the illustrated example, the base 110 includes a computing system 150 including data processing hardware 152 and memory hardware 154. The data processing hardware 152 is configured to execute instructions stored in the memory hardware 154 to perform computing tasks related to activities (e.g., movement and/or printing based activities) for the printer 100. Generally speaking, the computing system 150 refers to one or more locations of data processing hardware 152 and/or memory hardware 154. For example, the computing system 150 may be located locally on the printer 100 or as part of a remote system (e.g., a remote computer/server or a cloud-based environment).

The base 110 may further include a control panel 160 connected to the computing system 150. The control panel 160 includes a display 162 configured to display operational information associated with the printer 100 and may further include an input device 164, such as a keypad or selection button, for receiving commands from a user. In some examples, the display is a touch-sensitive display providing a graphical user interface (GUI) configured to receive the user commands from the user in addition to, or in lieu of, the input device 164.

The base 110 houses a curing system 170 configured to transmit actinic radiation into the fluid basin 130 to incrementally cure layers of the photopolymer resin contained within the fluid basin 130. The curing system 170 may include a projector or other radiation source configure to emit light at a wavelength suitable to cure the photopolymer resin within the basin. Thus, different light sources may be selected depending on the desired photopolymer resin to be used for fabricating a component C. In the present disclosure, the curing system 170 includes a liquid crystal panel 200 for curing the photopolymer resin within the fluid basin 130.

As shown, the fluid basin 130 is disposed atop the base 110 adjacent to the curing system 170 and is configured to receive a supply of the resin R from the dispensing system 120. The dispensing system 120 may include an internal reservoir 124 providing an enclosed space for storing the resin R until the resin R is needed in the fluid basin 130. The dispensing system 120 further includes a dispensing nozzle 122 in communication with the fluid basin 130 to selectively supply the resin R from the internal reservoir 124 to the fluid basin 130.

The build platform 140 may be movable along a vertical track or rail 142 (oriented along the z-axis direction, as shown in FIGS. 1A-1C) such that the base-facing build surface 144 of the build platform 140 is positionable at a target distance D1 along the z-axis from the bottom surface 132 of the fluid basin 130. The target distance D1 may be selected based on a desired thickness of a layer of solid material to be produced on the build surface 144 of the build platform 140 or onto a previously formed layer of the component C being fabricated. In some implementations, the build platform 140 may be removable from the printer 100. For instance, the build platform 140 may be removably attached to the rail 142 by an arm 146 (e.g., pressure fit or fastened onto) and may be selectively removed from the printer 100 so that the fabricated component C attached to the build surface 144 can be removed via the techniques described above.

In the example of FIGS. 1A-1C, the bottom surface 132 of basin 130 may be transparent to actinic radiation that is generated by the curing system 170 located within the base 110, such that liquid photopolymer resin located between the bottom surface 132 of the basin 130 and the build surface 144 of the build platform 140 or the component C being fabricated thereon, may be exposed to the radiation. Upon exposure to such actinic radiation, the liquid photopolymer may undergo a chemical reaction, sometimes referred to as "curing," that substantially solidifies and attaches the exposed resin to the build surface 144 of the build platform 140 or to a bottom surface of the component C being fabricated thereon.

Following the curing of a layer of the fabrication material, the build platform 140 may incrementally advance upward along the rail 142 in order to reposition the build platform 140 for the formation of a new layer and/or to impose separation forces upon any bond with the bottom surface 132 of basin 130. In addition, the basin 130 is mounted onto the base 110 such that the printer 100 may move the basin 130 along a horizontal axis of motion (e.g., x-axis). In an implementation, this motion may advantageously introduce additional separation forces. A wiper 134 is additionally provided, capable of motion along the horizontal axis of motion and which may be removably or otherwise mounted onto the base 110 or the fluid basin 130.

With continued reference to FIGS. 1A-1C, the printer 100 is shown at different stages of the fabrication process. For example, at FIG. 1A, the printer is shown in an initial state prior to dispensing the resin R into the basin 130 from the reservoir 124 of the dispensing system 120. Upon receipt of fabrication instructions, the printer 100 positions the build surface 144 of the build platform 140 at an initial distance D1 from the bottom surface 132 of the basin 130 corresponding to a thickness of the first layer of resin R to be cured. The curing system 170 then emits an actinic radiation profile (i.e., an image) corresponding to the profile of the current layer of the component C to cure the current layer. Upon curing of the current layer, the build platform 140 incrementally advances upward along the z-axis to the next build position. The distance of each advancement increment corresponds to a thickness of the next layer to be fabricated. The curing system 170 then projects the profile of the component layer corresponding to the new position. The new component layer is cured on a bottom surface of the previous component layer. The curing and advancing steps repeat until the build platform 140 reaches the final position (see FIG. 1C) corresponding to the finished component C.

Figure 2A:
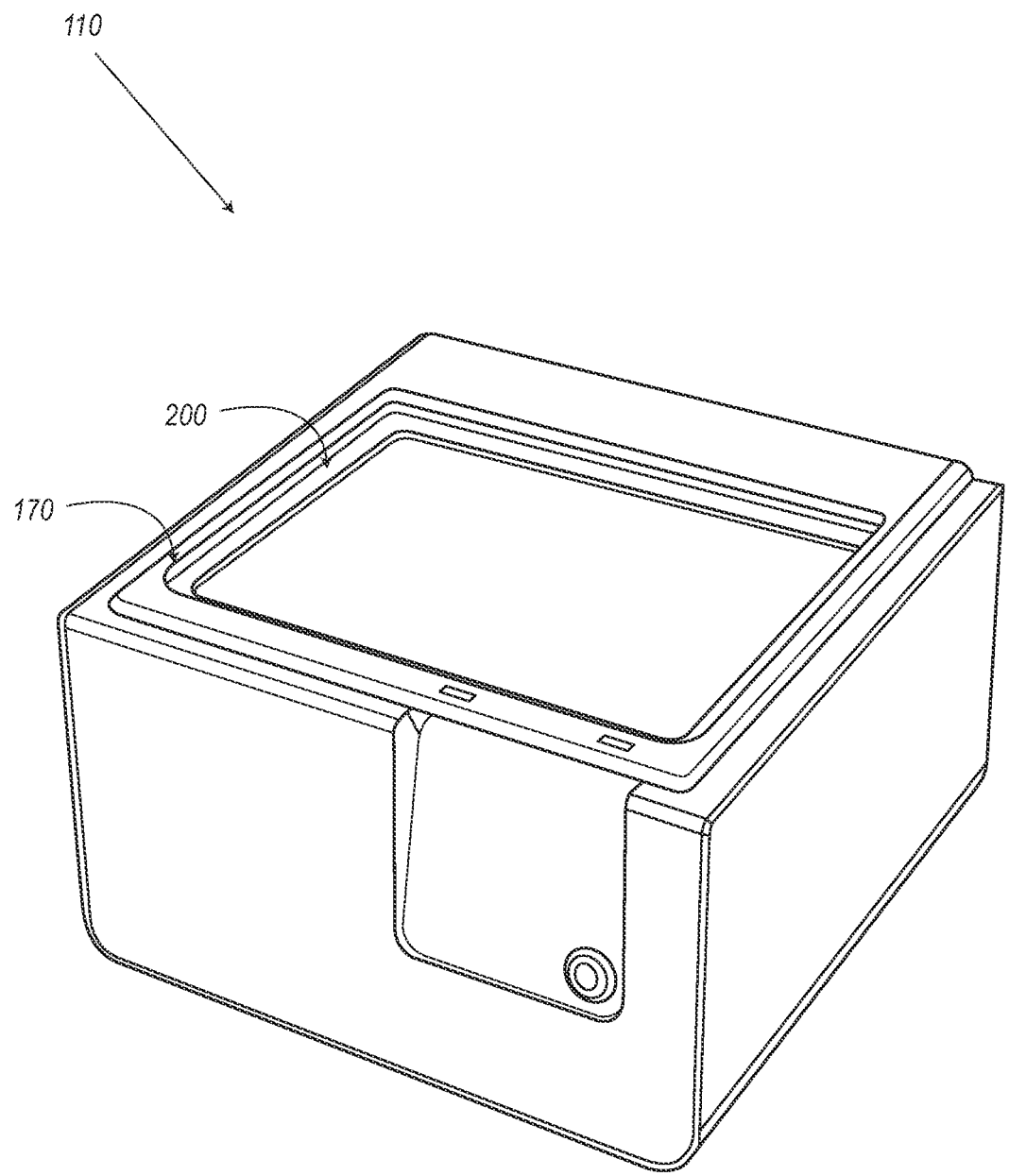
FIG. 2A shows a perspective view of an example base of the additive fabrication system of FIG. 1A.
Figure 2B:
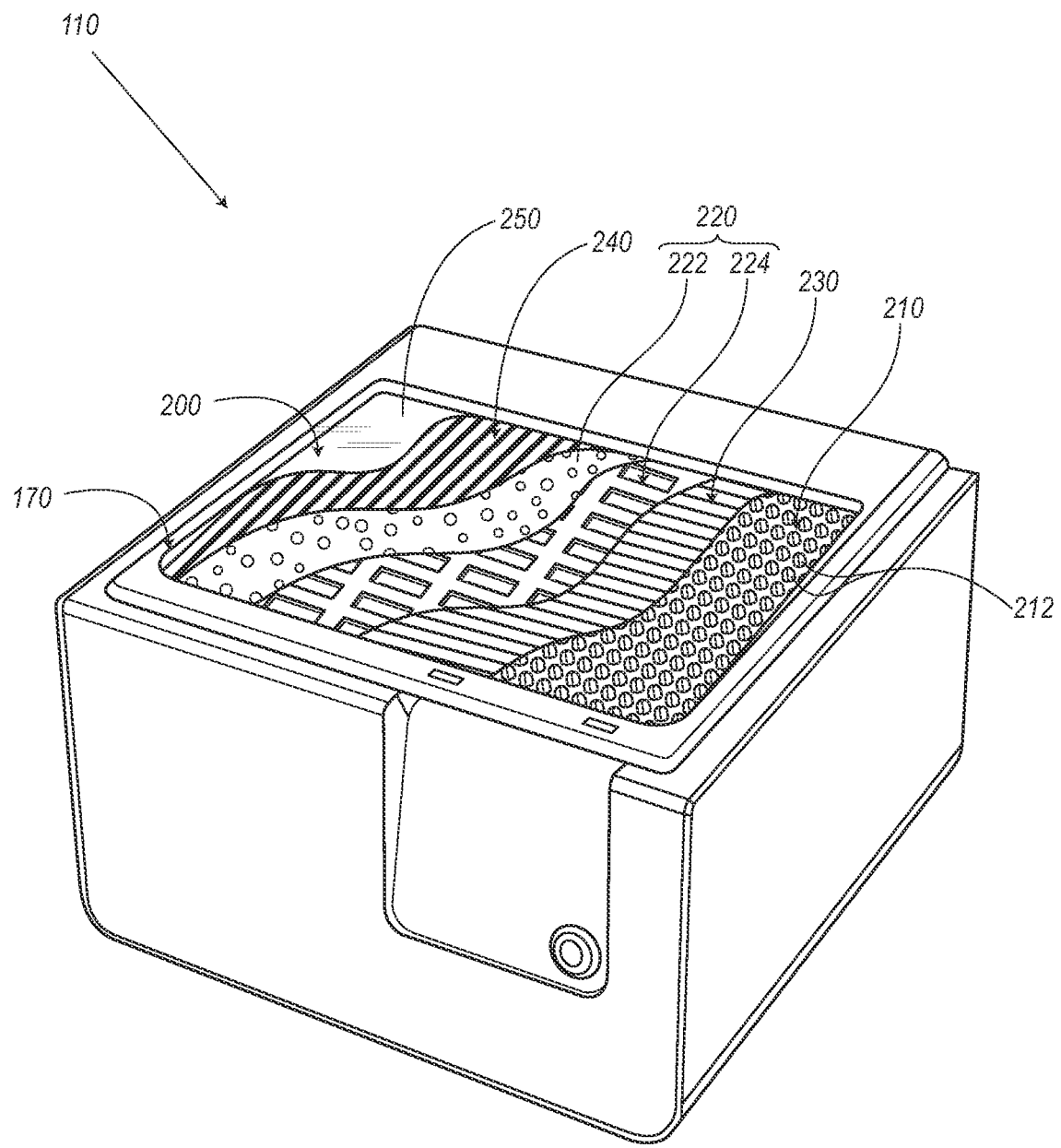
FIG. 2B shows a perspective view of the base of FIG. 2A, where components of a curing system of the base are partially sectioned to show a configuration of the curing system.
Figure 3:
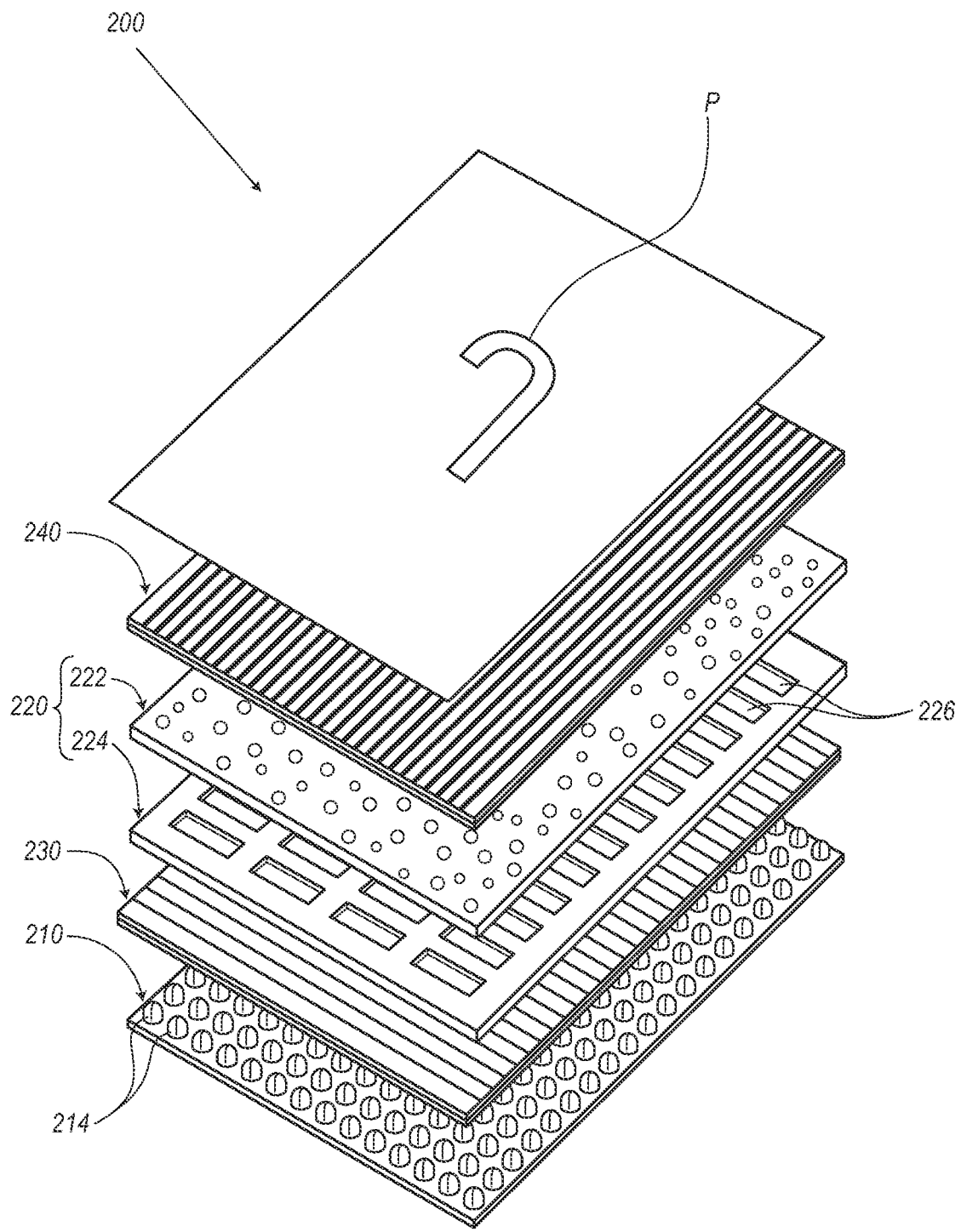
FIG. 3 is an exploded view of an example liquid crystal panel.

Referring to FIGS. 2A and 2B, the base 110 of the printer 100 is illustrated without the dispensing system 120, the basin 130, and the build platform 140 to show the curing system 170. FIG. 2A provides a perspective view of the base 110 and curing system 170 in a completed state while FIG. 2B provides a perspective view of the base 110 showing the curing system 170 in partial sectional views to expose the interior components of the liquid crystal panel 200 of the curing system 170. FIG. 3 further provides a schematic view of the liquid crystal panel 200. Note that, ratios among length, width, and thickness of each member in FIGS. 2A-3 are different from those of an actual curing system 170 for clarity.

Referring to FIGS. 1A-3, the curing system 170 is configured to provide actinic radiation through the bottom surface 132 of the basin 130 to cure a layer of the photopolymer resin within the basin 130. The curing system 170 of the present disclosure includes the liquid crystal panel 200 disposed adjacent to the basin 130. Unlike conventional additive fabrication systems, which may include curing systems based on lasers or DLP projectors, use of the liquid crystal panel 200 offers the advantage of providing a high-resolution (e.g., up to 7,680×4,320 pixels) dimensional grid with a minimized optical path between the panel 200 and the bottom surface 132 of the basin 130. Reducing the optical path minimizes potential thermal drift between the curing system 170 and the resin within the basin, ensuring more precise definition of the fabricated component C.

While off-the-shelf liquid crystal panels are available, these panels are typically optimized to output visible light for displaying an image for observation by the human eye. Thus, known liquid crystal panels (e.g., televisions or display monitors) generally emit various color components (e.g., blue, green, or red) within the visible part of the electromagnetic spectrum (e.g., 400 nm to 750 nm). However, many photopolymer resins used with additive fabrication devices 100 may be optimized to cure using a wavelength of between 365 nm and 415 nm. Because conventional liquid crystal panels are optimized to emit visible light, only approximately 1% of the light emitted from a conventional liquid crystal panel is output at the 365-415 nm wavelength. Accordingly, while functional, conventional liquid crystal panels are inefficient for use in a curing system 170, as curing rates would be significantly slower than known systems (e.g., lasers, DLP) using comparable amounts of power (e.g., Watts).

The liquid crystal panel 200 of the present disclosure is optimized to provide a greater optical transmission efficiency (e.g., greater than 10%) compared to optical transmission rates of conventional liquid crystal panels (e.g., approximately 1%), particularly with respect to wavelengths typically used for curing photopolymer resins (e.g., approximately 405 nm). With reference to FIGS. 2B and 3, the liquid crystal panel 200 includes a light unit 210, a liquid crystal cell 220, a first polarizer 230 disposed between the liquid crystal cell 220 and the light unit 210, and a second polarizer 240 disposed on an opposite side of the liquid crystal cell 220 than the first polarizer 230. The liquid crystal panel 200 may further include one or more glass layers 250 to provide support and protection for the liquid crystal panel 200. Unlike conventional liquid crystal panels, which may further include a color filter disposed between the liquid crystal cell 220 and the second polarizer 240, the liquid crystal panel 200 of the present disclosure does not include any color filter between the liquid crystal cell 220 and the second polarizer 240. Thus, the second polarizer 240 is disposed immediately adjacent to the liquid crystal cell 220 and receives unfiltered light directly from the liquid crystal cell 220.

The light unit 210 of the liquid crystal panel 200 includes a monochromatic light source 212 configured to emit an unpolarized light. In some implementations, the light source 212 is configured as a backlight provided adjacent to the first polarizer 230. Furthermore, the light source 212 may be selected to emit light in a wavelength corresponding to the wavelength for curing the photopolymer resin. For example, where the resin is curable at a wavelength of 405 nm, the light source 212 may be selected or tuned to emit a 405 nm wavelength light. Accordingly, the light source 212 emits an unpolarized, monochromatic light having a wavelength suitable for curing the resin. In the illustrated example, the light source 212 includes a panel having an array of light-emitting diodes (LEDs) 214. However, other light sources may be implemented as alternative or in addition to the panel array, including edge-lit LEDs and/or cold cathode fluorescent lamps. As discussed below, known light sources suitable for use in the light unit 210 generally have an optical transmission efficiency of approximately 50%, which must be accounted for when determining the overall optical efficiency of the curing system (see Table 1, below).

Referring to FIG. 3, the liquid crystal cell 220 includes a liquid crystal layer 222 and a substrate 224 disposed between the first polarizer 230 and a first side of the liquid crystal layer 222. The liquid crystal layer 222 may include liquid crystal molecules arranged in a twist alignment in the absence of an electric field. The twist alignment generally refers to an alignment in which liquid crystal molecules in a liquid crystal layer are arranged substantially in parallel to the surface of the substrate 224, and the arrangement direction thereof is twisted at a predetermined angle (e.g., 90° or 270°) on the substrate surface so that light reaching the second polarizer 240, which is also oriented at the predetermined angle, can pass through the second polarizer 240 in the absence of the electric field at the liquid crystal layer 222. Typical examples of the liquid crystal cell having a liquid crystal layer in such an alignment state include a liquid crystal cell 220 of a twisted nematic (TN) mode, a supertwisted nematic (STN) mode, in-plane switching (IPS), or an enhanced black nematic (EBN) mode.

The substrate 224 may include a plurality of switching elements 226 (e.g., thin-film transistors) each respectively associated with a pixel of the liquid crystal panel 200. The switching elements 226 are selectively turned on and off to control whether a specific pixel of the liquid crystal panel 200 will be illuminated by twisting the corresponding liquid crystal of the liquid crystal layer 222. Thus, in use, each of the switching elements 226 receives instructions from the computing system 150 corresponding to a profile P (see FIG. 4) of a current build layer of the component C. The switching elements 226 of the substrate 224 are then switched on and off to illuminate pixels of the liquid crystal panel 200 corresponding to the profile P of the build layer. Specifically, when a switching element 226 is switched off, the light passing through liquid crystal corresponding to the switching element 226 is rotated such that it passes through the second polarizer 240 to illuminate the corresponding pixel. Conversely, when the switching element is turn on, the liquid crystals are twisted such that light passing through the liquid crystal is not rotated and does not pass through the second polarizer 240. The substrate 224 may include an alignment film on the side facing the first side of the liquid crystal layer 222. In some examples, the alignment film includes a surface subjected to an alignment treatment. Any suitable alignment technique may be adopted as long as liquid crystal molecules are arranged in a constant alignment state on the surface of the substrate 224.

Each of the polarizers 230, 240 are configured to filter light having undefined or mixed polarization into light having a defined polarization. In an implementation, the first polarizer 230 and the second polarizer 240 may be oriented at a 90° angle relative to each other, such that the first polarizer 230 filters the unpolarized light received from the light source 212 and the second polarizer 240 further filters the rotated light received from the liquid crystal cell 220. Specifically, the first polarizer 230 is configured to convert light received from the light source 212 into a first polarized light by filtering the light into a P-polarized light and an S-Polarized light. The P-polarized light then passes through the liquid crystal cell 220 and is rotated the predetermined angle (e.g., 90° or) 270° by the switching elements 226. The second polarizer 240 is configured to allow the rotated light received from the liquid crystal cell 220 to pass through while filtering out light that is not rotated by the predetermined angle. Thus, rotated light associated with each pixel defining the profile P of the build layer passes through the second polarizer 240 such that second polarizer 240 emits the profile P of the current build layer.

Conventional liquid crystal panels may implement a single layer or a multi-layered polarizing film, or a laminate (so-called polarizing plate) including a substrate and a polarizing film, or in which a polarizing film is sandwiched between at least two substrates via any adhesion layer. When incident light is split into two perpendicular polarization components (i.e., S-polarized light and P-polarized light), polarizer films used in conventional liquid crystal panels have a function of transmitting one of the polarization components and absorbing the other one of the perpendicular polarization component. In the display industry, the polarizers are typically made from an extruded Polyvinyl Alcohol (PVA) film impregnated with iodine. When PVA is stretched, the molecules are aligned such that a preferred polarization state of the light is transmitted. The iodine is used to absorb the light of the polarization state that is perpendicular to the aligned PVA structure. These polarizing films are then laminated directly to the transistor/LC layers. The PVA/iodine polarizing films are extremely common and cost effective, with large volumes driven by the LCD display industry. However, data shows that absorptive polarizers that implement conventional polarizing films generally transmit only about 60% of incident energy.

In an implementation, the polarizers 230, 240 are optimized to maximize transmissivity of the 405 nm wavelength (or near-UV at 365-415 nm) through each polarizer 230, 240. The first polarizer 230 and the second polarizer 240 may be the same or different. For example, each of the above polarizers 230, 240 may include a wire grid polarizer optimized for transmission of the 405 nm wavelength (or near-UV at 365-415 nm). Unlike conventional film-based polarizers (e.g., extruded PVA film impregnated with iodine), which may only transmit 60% of incident light (including light at the 405 nm wavelength), a wire grid polarizer may transmit approximately 80% of incident light at the 405 nm wavelength. Thus, implementing each of the first polarizer 230 and the second polarizer 240 as wire grid polarizer (80% optical efficiency) provides a 33% increase in optical transmission at each polarizer 230, 240 compared to film-based polarizers (60% optical efficiency).

Optionally or alternatively, the first polarizer 230, the second polarizer 240, or both, may include a thin-film dielectric polarizer optimized for transmission of the 405 nm wavelength. Thin-film dielectric polarizers may have an optical transmission rate of up to approximately 98% for light having a wavelength of 405 nm. However, thin-film dielectric polarizers operate at a relatively large incident angle (e.g., 45° or larger), which limits the practical use of thin-film dielectric polarizers to incorporation as the first polarizer 230 disposed adjacent to the light source 212. Nevertheless, incorporating a thin-film dielectric polarizer (98% optical efficiency) as the first polarizer 230 provides a 63% increase in optical transmission at the first polarizer 230 compared to a film-based polarizer (60% optical efficiency).

Optionally or alternatively, the first polarizer 230, the second polarizer 240, or both, may be dye-type polarizers (e.g., PVA films containing dichroic dye). Implementing dye-type polarizers on a stereolithography printer provides several benefits over other configurations. Iodine-type and dye-type polarizers are both absorptive polarizers. This means that photons that do not get transmitted are absorbed and heat is created in the polarizer, which leads to a decline in transmission. This is in addition to the heat created as part of the stereolithography printing process, especially during photopolymerization. When heat is introduced to iodine/PVA polarizers, first the iodine is sublimated and the transmission of the polarizer increases. The heat causes polyene formation to occur in the PVA structure. Polyene formation in the polarizer film causes the polarizer film to turn brown which results in a rapid decline in transmission. As a result, users are required to replace the LCD screen within the typical lifetime of a stereolithography 3D printer. The LCD screen then becomes a consumable, which increases the total cost of ownership for a stereolithography printer and produces waste. This is one of the key hurdles holding back LCD projection as a widespread optical system used in stereolithography printers.

Alternatively, the organic dyes in many dye-type polarizers are much more robust to temperature relative to iodine, and the dye does not sublimate when exposed to typical stereolithography printing temperatures. Polyene formation in the PVA structure does occur in dye-type polarizers, but at a significantly slower rate than in Iodine-type polarizers due to the differences in chemistry. The result is that dye-type polarizers will last for the reasonable lifetime of a stereolithography printer, creating a tremendous advantage in customer value and reduces waste.

While crystalline, wire grid, and dielectric coating polarizers are more resistant to UV, near UV light, and heat compared to conventional PVA/iodine polarizers, these polarizers are orders of magnitude more expensive to produce in large sheets as required to span the typical LCD screen sizes found in stereolithography printers.

On the other hand, dye-type polarizers can be produced in a similar way as PVA/iodine polarizers, and therefore can be produced in large sheets to fit the dimension of LCD screen sizes in stereolithography printers without significantly increasing the cost. The PVA is extruded to align the molecules, and organic dye is impregnated into the PVA matrix instead of iodine. As a result, the dye-type polarizer film can be produced in large sheets to cover the size of a typical stereolithography printer LCD screen. The dye-type polarizers can be laminated to an LCD screen in the same way as a PVA/iodine polarizer, or they can be configured in the stereolithography printer as separate pieces in line with the transistor/liquid crystal layers.

Dye-type polarizers may include organic dyes that are resistant to UV light, near UV light, and heat. As a result, dye-type polarizers increases the lifetime of the LCD screen in a stereolithography printer. With properly configured dye-type polarizer (e.g., maximally transmissive to 365-415 nm yet resistant to degradation), the LCD screens will no longer be a consumable and can even exceed the lifetime of a stereolithography printer. In some implementations, the dye-type polarizer is configured to operate at an environment of between 10 and 120 degrees Celsius, and to receive a flux (e.g., from the light source) greater than 20 mW/cm.$^2$ Further, dye-type polarizers can be configured (e.g., by changing the type or concentration of dye) to achieve better or equal optical transmission at lower wavelength relative to that at 405 nm. There are some resin chemistries that are more sensitive to lower wavelength light, such as 365 nm, which would increase print speed. Additionally there are some material properties that can be improved (e.g., tensile strength) with lower wavelength light. This effect is difficult to achieve on PVA/iodine polarizers as there is a drop-off of about 20% in optical transmission between 405 nm and 365 nm for iodine.

In some implementations, the dye-type polarizers can include dyes made from one or more of metal diazo compounds, trisazo compounds, biphenyldiazo, trisazo or disazomonoazoxy compounds, and metal-containing biphenyldisazo, trisazo or disazomonoazoxy compounds.

As previously discussed, the liquid crystal panel 200 of the present disclosure omits the use of color filters employed by conventional liquid crystal panels, and thereby increases light transmission efficiency relative to conventional liquid crystal panels. For example, in Table 1 below, testing showed a 500% increase in optical transmission rates at the 405 nm wavelength for liquid crystal panels operated without a colored filter compared to liquid crystal panels operated with a colored filter. Thus, a color filter has an optical transmission efficiency of approximately 20%, which must be accounted for when determining the overall optical efficiency of the curing system (see Table 1 below).

As set forth above, implementing polarizers 230, 240 having a higher optical transmission efficiency in combination with no color filter provides a significant increase in the overall optical transmission efficiency of the liquid crystal panel 200. Table 1 illustrates a comparison of the optical transmission efficiency of (i) a conventional, color-filtered liquid crystal panel including absorptive film polarizers, (ii) an unfiltered liquid crystal panel according to the present disclosure including two wire grid polarizers, (iii) an unfiltered liquid crystal panel according to the present disclosure including a thin-film dielectric polarizer and a wire grid polarizer, and (iv) an unfiltered liquid crystal panel according to the present disclosure including two dye-type polarizers.

TABLE 1

Liquid Crystal Panel Optical Transmission Rates

| Component | Color Filter; Conventional Polarizers | No Color Filter; Wire Grid Polarizers | No Color Filter; Thin Film Dielectric & Wire Grid Polarizers | No Color Filter; Dye-type Polarizers |
|---|---|---|---|---|
| | Component Efficiency (Absolute Efficiency) | | | |
| Light Unit Emission | 50% (50%) | 50% (50%) | 50% (50%) | 50% (50%) |
| First Polarizer | 60% (30%) | 80% (40%) | 98% (49%) | 80% (40%) |
| Liquid Crystal Layer | 35% (10.5%) | 35% (14%) | 35% (17.2%) | 35% (14%) |
| RGB filter | 20% (2.1%) | N/A | N/A | N/A |
| Top polarizer | 60% (1.3%) | 80% (11.2%) | 80% (13.7%) | 80% (11.2%) |
| Final Output | 1.3% | 11.2% | 13.70% | 11.2% |

As shown in Table 1, the conventional liquid crystal panel including the color filter and absorptive polarizers may only transmit approximately 1.26% of the light energy generated by the light emission unit. Removing the color filter and implementing first and second wire grid polarizers (80% efficient) increases overall optical efficiency to approximately 11.2%, while further replacing the first polarizer with a thin-film dielectric polarizer (98% efficient) further increases the overall efficiency of the liquid crystal panel to approximately 13.7%. Replacing the first and the top polarizers with dye-type polarizers (80%) also increases overall optical efficiency to approximately 11.2%, but at a much lower cost compared to using wire grid and thin film polarizers.

It is appreciated that other permutations of the polarizer arrangement not listed in Table 1 is also contemplated. For example, the first polarizer and the top polarizer may be any of the conventional polarizer, the wire grid polarizer, thin film dielectric, or the dye-type polarizer.

The increased optical transmission efficiency of the liquid crystal panel 200 of the present disclosure allows curing times to be significantly reduced compared to a curing system that may incorporate a conventional filtered liquid crystal panel. Process times may be further modified by adjusting the power input to the light unit. For example, the light unit may be configured to operate at a higher power level to increase the flux of the liquid crystal panel. In some examples, the light unit includes a power output ranging from 50 Watts to 100 Watts. However, higher-power light units 210 may also be implemented. Here, an increase in power may result in reduced lifespan of the liquid crystal panel 200 resulting from higher flux. Accordingly, a power of the light unit 210 may be selected to balance process cycle times and lifespan of the components of the liquid crystal panel 220. In some examples, the liquid crystal panel 200 may operate at a power range to provide a flux ranging from 5 mW/cm$^2$ to 40 mW/cm$^2$.

Figure 4:
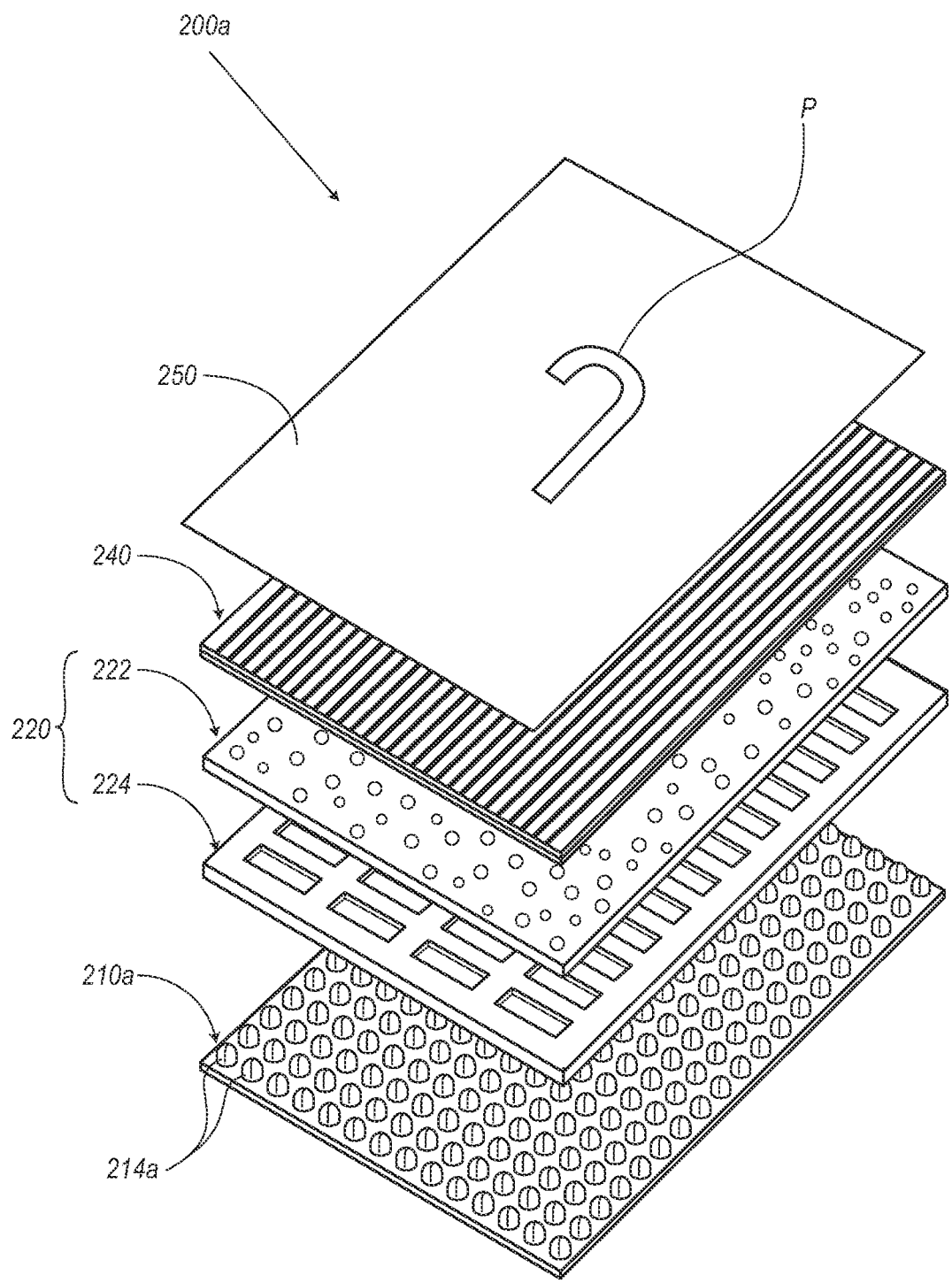
FIG. 4 is an exploded view of another example of a liquid crystal panel.

Referring to FIGS. 3-4, in some implementations, the light unit 210 of the liquid crystal panel includes a polarized light source 212 that implements LEDs 214. In these implementations, the first polarizer 230 may be omitted from the liquid crystal panel 200 such that the light source 212 provides polarized light directly to the liquid crystal cell 220, as shown in FIG. 4. Although polarized light sources 212 are typically more costly per watt than comparable unpolarized light sources, providing a direct source of polarized light may provide significantly reduced divergence of the actinic radiation compared to passing unpolarized light through a first polarizer, thereby providing a further improvement to optical transmission efficiency of the liquid crystal panel 200.

Figure 5:
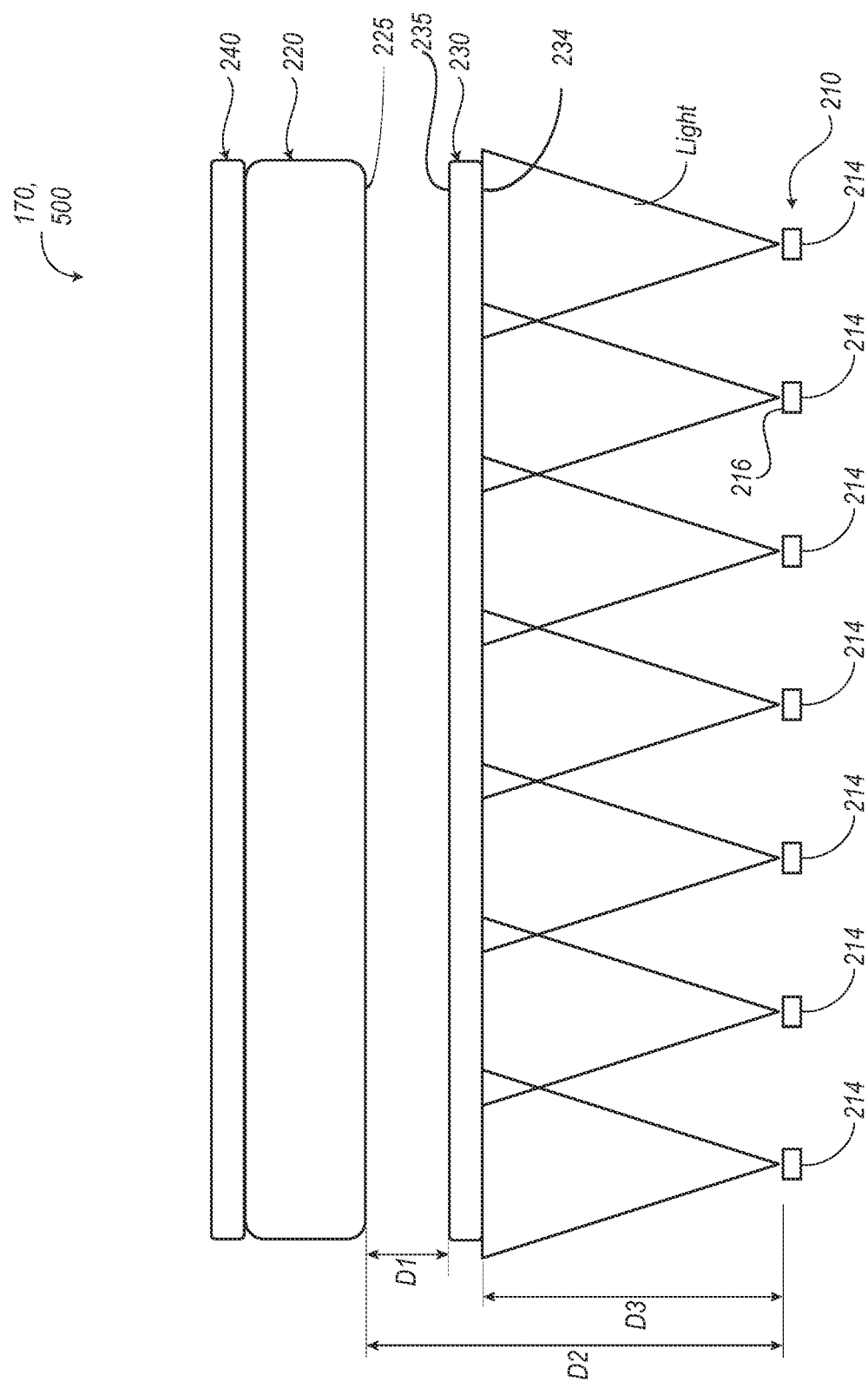
FIG. 5 is a schematic sectional view of an example polarized light generation system.

FIG. 5 shows a schematic view of a system 500 for providing polarized light (i.e., P-polarized light), which may be incorporated as part of a curing system 170 in conjunction with the liquid crystal cell 220 and the second polarizer 240 discussed previously. As shown, the first polarizer 230 and the light unit 210 including the array of LEDs 214 are decoupled from, or not integrated to (e.g., not laminated to), the liquid crystal cell 220. in accordance with some implementations. In these implementations, the first polarizer 230 is disposed at a location (e.g., positon or orientation) wherein a top side 235 of the first polarizer 230 is spaced apart from a bottom side 225 of the liquid crystal cell 220 by a first distance D1 and the light source 210 including the array of LEDs 214 is disposed at a location (e.g., position or orientation) wherein a top side 216 of each LED 214 is spaced apart from the bottom side 225 of the liquid crystal cell 220 by a second distance D2, which is greater than the first distance D1. In some implementations, a bottom side 234 of the first polarizer 230 is spaced apart from the light source 210 by a third distance D3. As shown, the third distance D3 is greater than the first distance D1 in some implementations. However, in some implementations, the first distance D1 is equal to or greater than the third distance D3.

In some implementations, it is beneficial to separate the first polarizer 230 and the light source 210 (including the array of the LEDs 214) from the liquid crystal cell 220. For example, when the first polarizer 230 is separated from the liquid crystal cell 220 by a certain distance (e.g., first distance D1), the first polarizer 230 can be easily replaced without damaging the liquid crystal cell 220. In a situation that the first polarizer 230 is degraded to a certain point (e.g., discoloration), the user can easily replace the first polarizer 230 without damaging the liquid crystal cell 220. Similarly, in some instances, it is beneficial to separate the light source 210 from the first polarizer 230 so the user can replace the light source 210 including the array of the LEDs 214 if at least one of the LEDs 214 is operating abnormally. These will substantially reduce the cost of ownership of the curing system 170.

The first polarizer 230 may be at least one of PVA/iodine polarizer, wire grid type polarizer, dielectric film type polarizer, crystalline type polarizer, or dye type polarizer in some implementations. However, the first polarizer 230 is not limited to being constructed from the polarizer types mentioned above, but may be formed of other types of polarizer.

Figure 6:
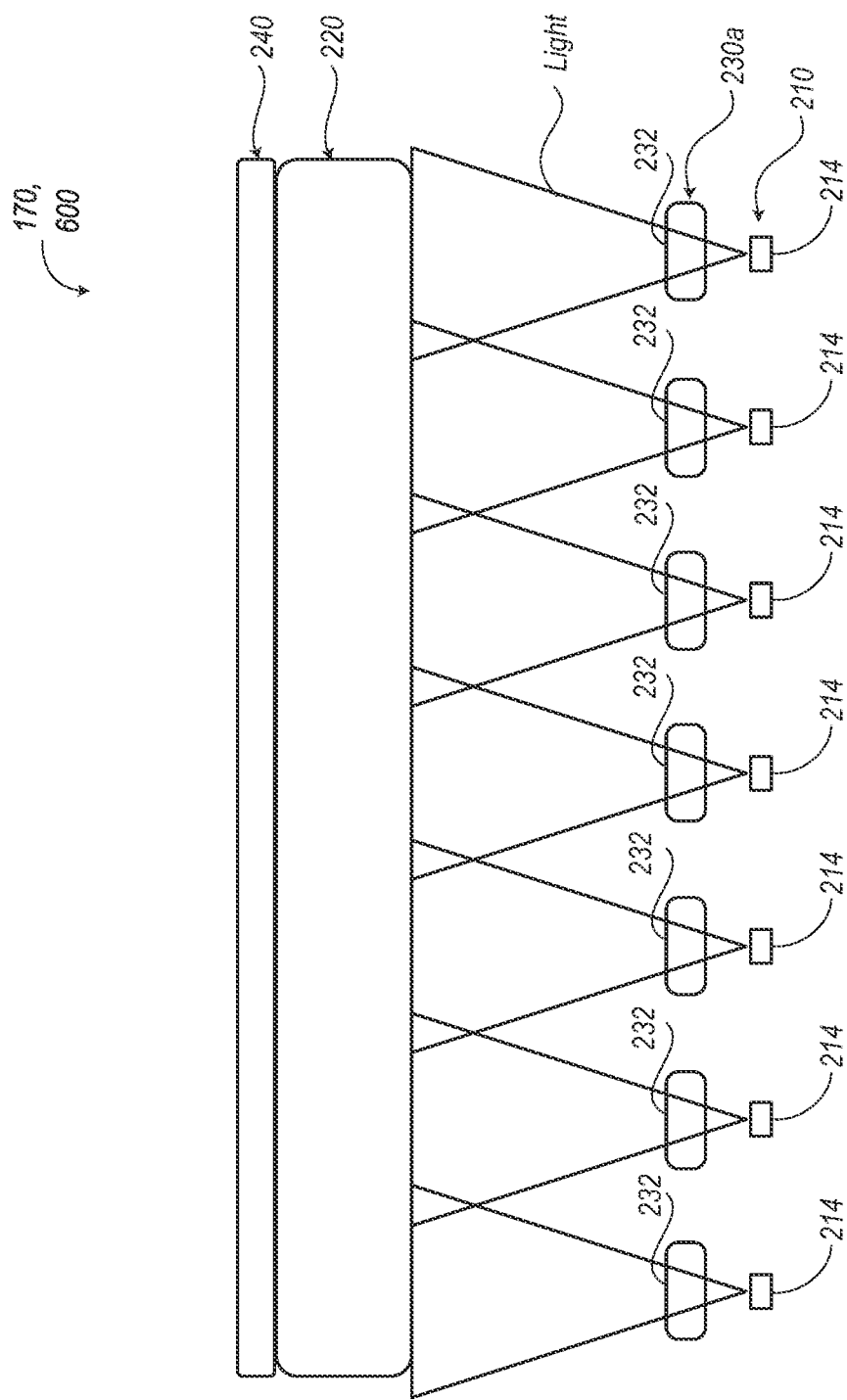
FIG. 6 is a schematic sectional view of another example of polarized light generation system.

FIG. 6 shows a schematic sectional view of a curing subsystem 600 for providing the polarized light (i.e., P-polarized light), which may be incorporated as part of a curing system 170 in conjunction with the liquid crystal cell 220 and the second polarizer 240 discussed previously. As shown, the curing subsystem 600 includes a first polarizer 230a and the polarized light source 210 that are vertically spaced apart from the liquid crystal cell 220 and the second polarizer 240.

In some implementations, as shown, the array of LEDs 214 included in the light source 210 are configured to provide the unpolarized light to the first polarizer 230a. The first polarizer 230a implemented in the curing subsystem 600 is divided into individual polarizer units 232 that are laterally spaced apart from each other to reduce the overall material of the first polarizer 230 required to generate the polarized light from the light source 210. In these implementation, each of the polarizer units 232 of the first polarizer 230a is disposed adjacent to and overlapped with a corresponding LED 214 to generate the polarized light. Since the first polarizer 230a (i.e., polarizer units 232 of the first polarizer 230) is disposed adjacent to the array of LEDs 214 and is separated from the liquid crystal cell 220, the same or substantially equal amount of the polarized light can be generated with less material of the first polarizer 230 compared to polarized light generated by the first polarizer 230 in the curing subsystem 700 in the FIG. 7. Thus, the curing subsystem 700 may provide comparable performance characteristics to the system of FIG. 6 while minimizing material costs.

As shown in FIG. 6, each of the polarizer units of the first polarizer 230a is disposed adjacent to and overlapped with the corresponding LED 214 in a direction (e.g., vertical direction or Z-axis) that the unpolarized light from the light source 210 is converted to the polarized light an early stage of dispersion. By converting the unpolarized light at the early stage of dispersion, the overall material of the first polarizer 230 is reduced. In other words, by placing the individual polarizer units 232 closer to the light source 210, the respective sizes of the polarizer units 232 is minimized.

The first polarizer 230 implemented in the curing subsystem 600 may be at least one of PVA/iodine polarizer, wire grid type polarizer, dielectric film type polarizer, crystalline type polarizer, or dye type polarizer in some implementations. However, the first polarizer 230 is not limited to being constructed from the exemplary polarizer types mentioned above but maybe formed of other polarizer types.

Figure 7:
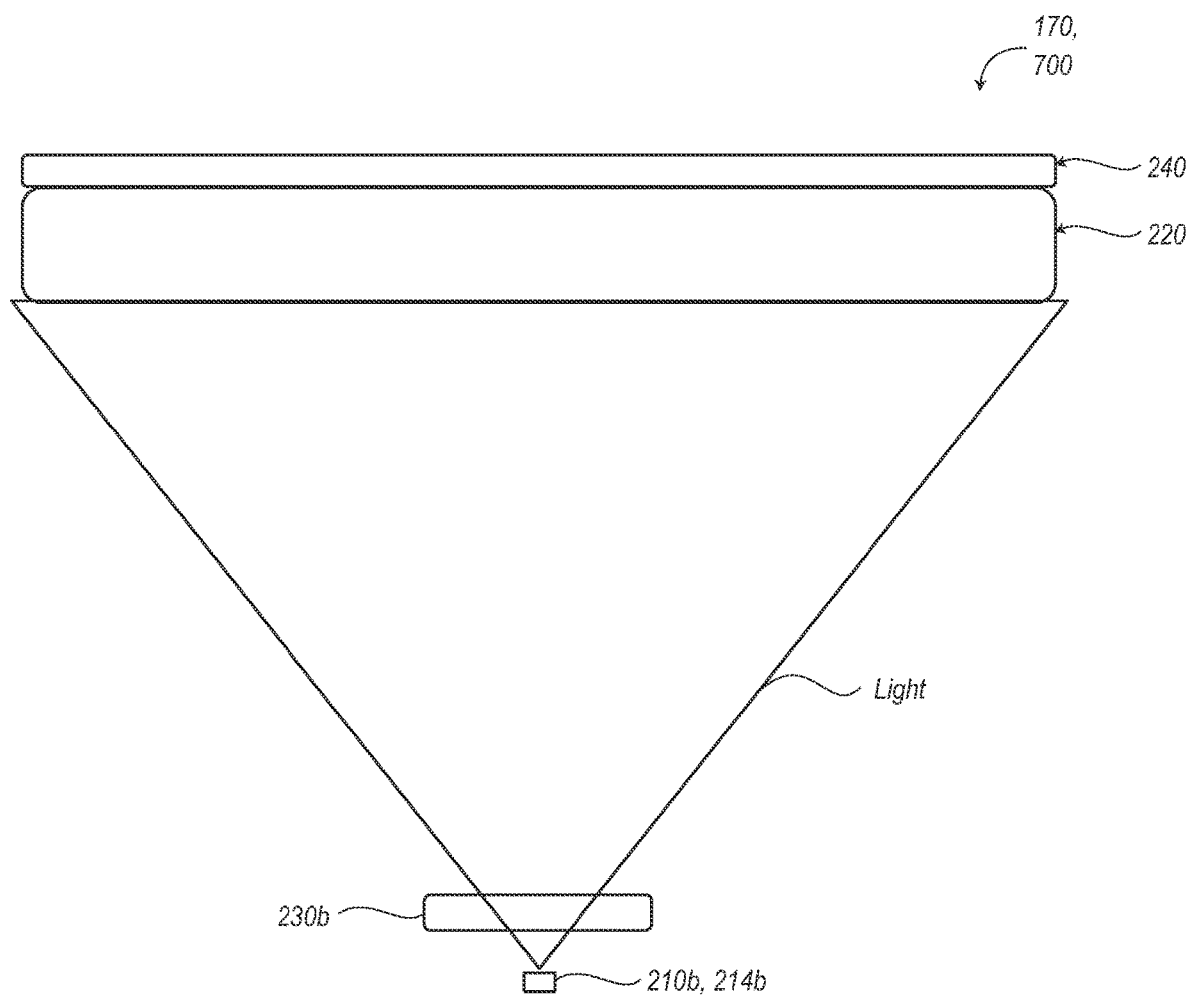
FIG. 7 is a schematic sectional view of additional example of polarized light generation system.

FIG. 7 shows a schematic sectional view of a curing subsystem 700 for providing polarized light (i.e., P-polarized light), which may be incorporated as part of a curing system 170 in conjunction with the liquid crystal cell 220 and the second polarizer 240 discussed previously. As shown, the curing subsystem 700 includes a light unit 210$b$ and a first polarizer 230$b$ disposed adjacent to the light unit 210$b$. In some implementations, as shown, the light unit 210$b$ is a high-power LED 214$b$, which is capable of providing adequate "backlight" to the liquid crystal cell 220.

As shown, the size (i.e., length and/or width) of the first polarizer 230$b$ implemented in the system 700 is substantially smaller than the size of the liquid crystal cell 220. Since the first polarizer 230 is disposed adjacent to and overlapped with the high-power LED 214$b$ of the light unit 210$b$ in a first direction (e.g., vertical direction or Z-axis) and is separated from the liquid crystal cell 220, the first polarizer 230$b$ in the smaller size is capable of generating the polarized light that can cover the entire or substantial portion of the liquid crystal cell 220 using the diverging light from the high-power LED 214$b$.

As shown in FIG. 7, the first polarizer 230 in the smaller size is disposed adjacent to and overlapped with the high power LED 214$b$ of the light unit 210$b$ in a direction (e.g., vertical direction or Z-axis) and the polarized light is generated using the (unpolarized) light from the light source 210$b$ at an early stage of dispersion. By converting the light at the early stage of dispersion, the overall material of the first polarizer 230 is minimized.

In some instances, it is also helpful to utilize the high-power LED 214$b$ of the light source 210$b$ along with the first polarizer 230 disposed adjacent to the high-power LED 214$b$ to reduce the cost of manufacturing by minimizing the size of first polarizer 230 required to generate the polarized light.

The first polarizer 230$b$ implemented in the system 700 may be at least one of PVA/iodine polarizer, wire grid type polarizer, dielectric film type polarizer, crystalline type polarizer, or dye type polarizer in some implementations. However, the first polarizer 230$b$ is not limited to being constructed from the exemplary polarizer types mentioned above but maybe formed of other types of polarizer.

Figure 8:
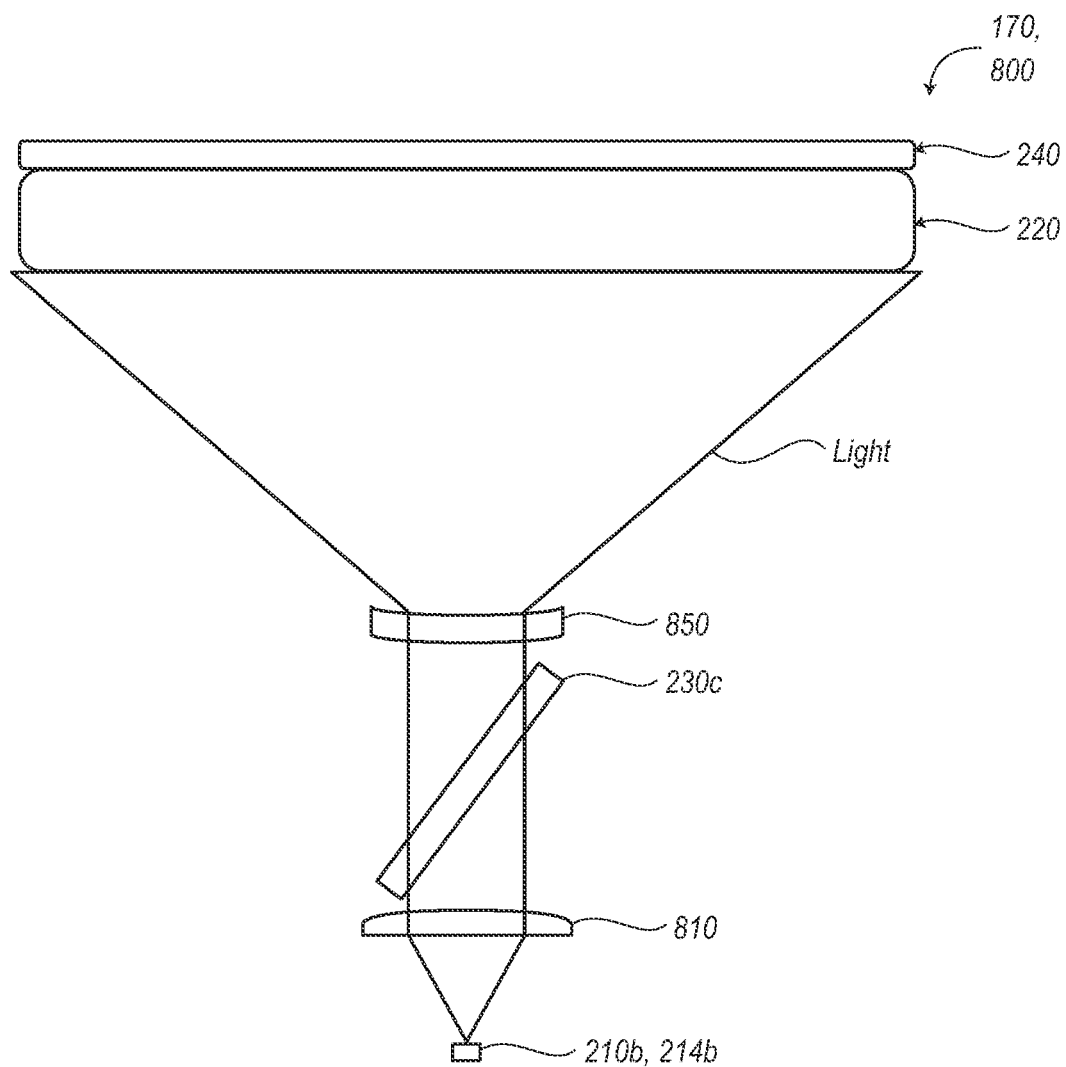
FIG. 8 is a schematic sectional view of additional example of polarized light generation system.

FIG. 8 shows a schematic sectional view of a curing subsystem 800 for providing polarized light (i.e., P-polarized light), which may be incorporated as part of the curing system 170 in conjunction with the liquid crystal cell 220 and the second polarizer 240 discussed previously. As shown, the curing subsystem 800 includes the light unit 210, a collimating lens 810, a diverging lens 850, the first polarizer 230$c$ embodied as a dielectric polarizer (e.g., tilted polarizer) disposed between the collimating lens 810 and the diverging lens 850. In some implementations, as shown, the light unit 210$b$ is embodied as a high power light emitting diode which is capable of providing adequate "backlight" to the liquid crystal cell 220 and the second polarizer 240.

As shown, when a dielectric polarizer is implemented as the first polarizer 230$c$, the first polarizer 230$c$ separates the (unpolarized) light received from the light source 210$b$ into P-polarized light that is parallel to the plane of incidence, and S-polarized light that is perpendicular to the plane of incidence. In these implementations, the collimating lens 810 is disposed between the light source 210$b$ and the first polarizer 230 to change the diverging light from the light source 210$b$ (i.e., high-power LED) into a parallel beam and to provide the parallel beam to the first polarizer 230$c$. The diverging lens 850 is disposed between the first polarizer 230$c$ and the liquid crystal cell 220. The diverging lens 850 is implemented to receive the P-polarized light of the parallel beam and to spread out the P-polarized light to the entirety or a substantial portion of the liquid crystal cell 220. In these implementations, the high-power LED 214$b$ of the light source 210$b$, the collimating lens 810, the first polarizer 230$c$, the diverging lens 850, and the liquid crystal cell 220 are aligned with each other in a first direction (e.g., vertical direction or Z-axis).

In some instances, it is beneficial to separate the first polarizer 230 and the light source 212 from the liquid crystal cell 220 as discussed previously. In some instances, it is also helpful to utilize the high-power LED 214$b$ of the light source 210$b$ along with the first polarizer 230 embodied as a dielectric polarizer (e.g., tilted polarizer) to reduce the cost of manufacturing by reducing the size of first polarizer 230 required to generate the polarized light.

Figure 9:
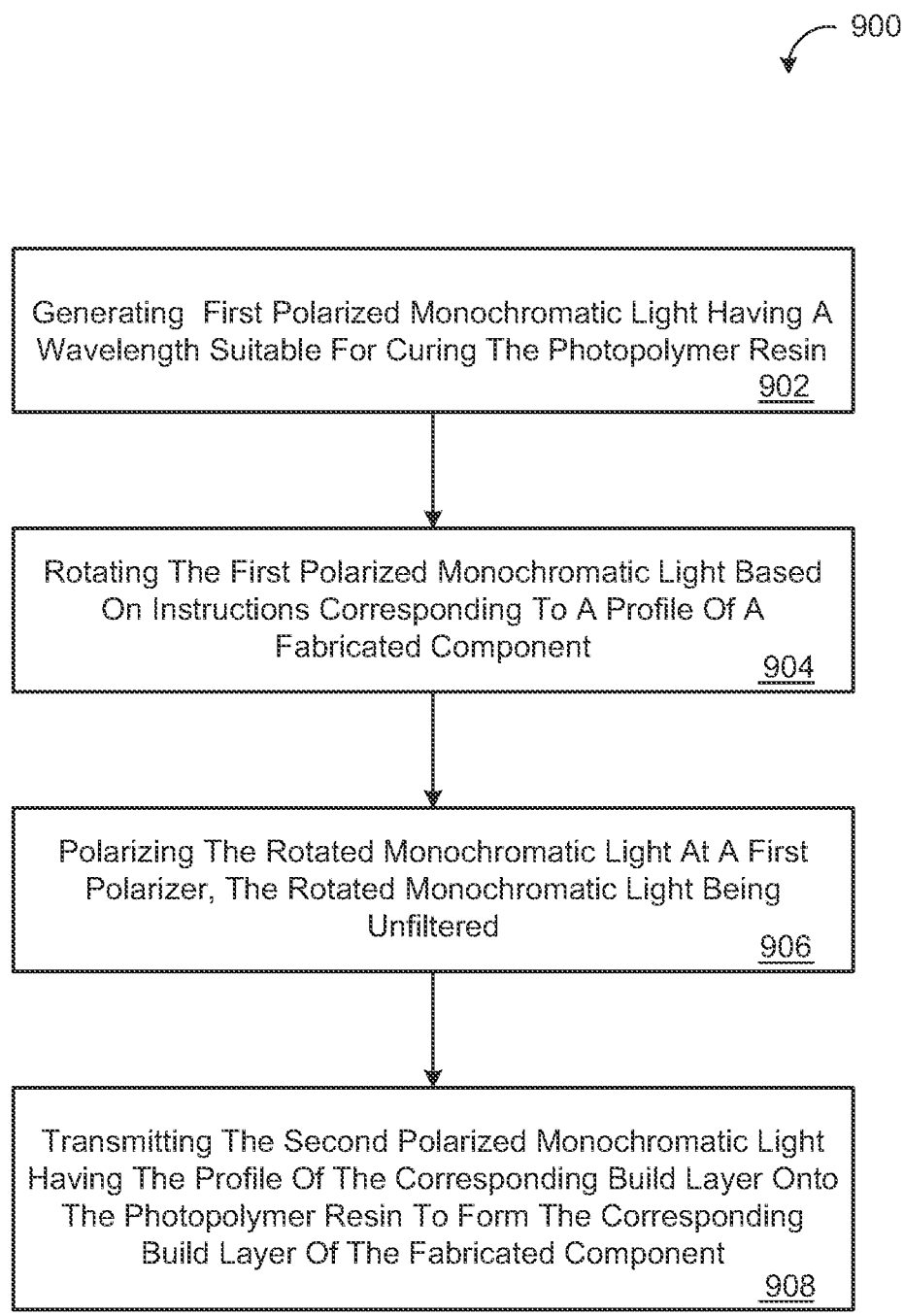
FIG. 9 is a flowchart of an example arrangement of operations for a method curing a photopolymer resin.

FIG. 9 is a flowchart of an example arrangement of operations for a method 600 for curing a photopolymer resin using a liquid crystal panel 200 according to the present disclosure. At operation 902, the method includes generating, by the liquid crystal panel 200, a first polarized monochromatic light and receiving, by a liquid crystal cell 220 of the liquid crystal display 200, the first polarized monochromatic light. As discussed above, the first polarized monochromatic light may be generated by subjecting unpolarized light generated by the light unit 210 to a first polarizer 230, which may include a wire grid polarizer or a thin-film dielectric polarizer. In other implementations, the first polarized monochromatic light is generated by a polarized light unit 210$a$. The first polarized monochromatic light has a wavelength selected for curing the particular photopolymer resin of the build component C, such as, for example, 405 nm.

At operation 904, the method 900 includes rotating, by the liquid crystal cell 220, in an absence of an electrical field, the first polarized monochromatic light. For instance, the liquid crystal cell 220 may rotate the first polarized monochromatic light by twisting the first polarized monochromatic light based on instructions corresponding to a profile P of a fabricated component C. For example, where the profile P of a corresponding build layer requires that one or more specific pixels of the liquid crystal panel 200 be illuminated, the instructions may cause one or more switching elements 226 each associated with a corresponding one of the one or more specific pixels to activate for twisting corresponding liquid crystal molecules of the liquid crystal cell 220 to rotate the first polarized monochromatic light by 90°.

At operation 906, the method 900 includes receiving the rotated first polarized monochromatic light at the second polarizer 240 and polarizing, by the second polarizer 240, the rotated first polarized monochromatic light a second time into second polarized monochromatic light having the profile P of the corresponding build layer. Here, the first polarized monochromatic light received by the second polarizer 240 is unfiltered. In other words, the rotated first polarized monochromatic light does not pass through a color filter prior to being received by the second polarizer 240. At operation 908 of the method 900, the second polarizer 240 transmits the second polarized monochromatic light having the profile P of the corresponding build layer onto the photopolymer resin to form the corresponding build layer of the build component C. This process is incrementally repeated for subsequent build layers, with each build layer including a unique profile P.

In some examples of the method 900, generating the first polarized monochromatic light includes generating a first polarized monochromatic light having a wavelength of 405 nanometers. The first polarized monochromatic light may be generated by polarizing a non-polarized monochromatic light using the first polarizer 230. In some configurations, the first polarizer 230 includes a thin film dielectric polarizer. In some examples, the first polarizer 230 includes a wire grid polarizer. Alternatively, generating the first polarized monochromatic light includes emitting the first polarized monochromatic light from LEDs 214 of the light source 212. Optionally, rotated first monochromatic light may be polarized using a wire grid polarizer.

The method 900 may further include polarizing, by the first polarizer 230 of the liquid crystal panel 200 of the curing system 170, a non-polarized monochromatic light into the first polarized monochromatic light comprising P-polarized light and a third polarized monochromatic light comprising S-polarized light. The method 900 may also include converting, by the half-wave plate 510 of the curing system 170, the third polarized monochromatic light comprising S-polarized light into a fourth polarized monochromatic light comprising P-polarized light. The method 900 may further include transmitting, from the half-wave plate 510 of the curing system 170, the fourth polarized monochromatic light comprising P-polarized light to the liquid crystal cell 220 of the curing system 170.

In some examples, the method 900 includes combining, at the liquid crystal cell 220 of the liquid crystal panel 200, the first polarized monochromatic light comprising the P-polarized light and the fourth polarized monochromatic light comprising P-polarized light. The method 900 may also include rotating, by the liquid crystal cell 220 of the liquid crystal panel 200, the combined first polarized monochromatic light and fourth polarized monochromatic light, the rotated combined first polarized monochromatic light and fourth polarized monochromatic light having the profile of the corresponding build layer of the fabricated component C.

Figure 10:
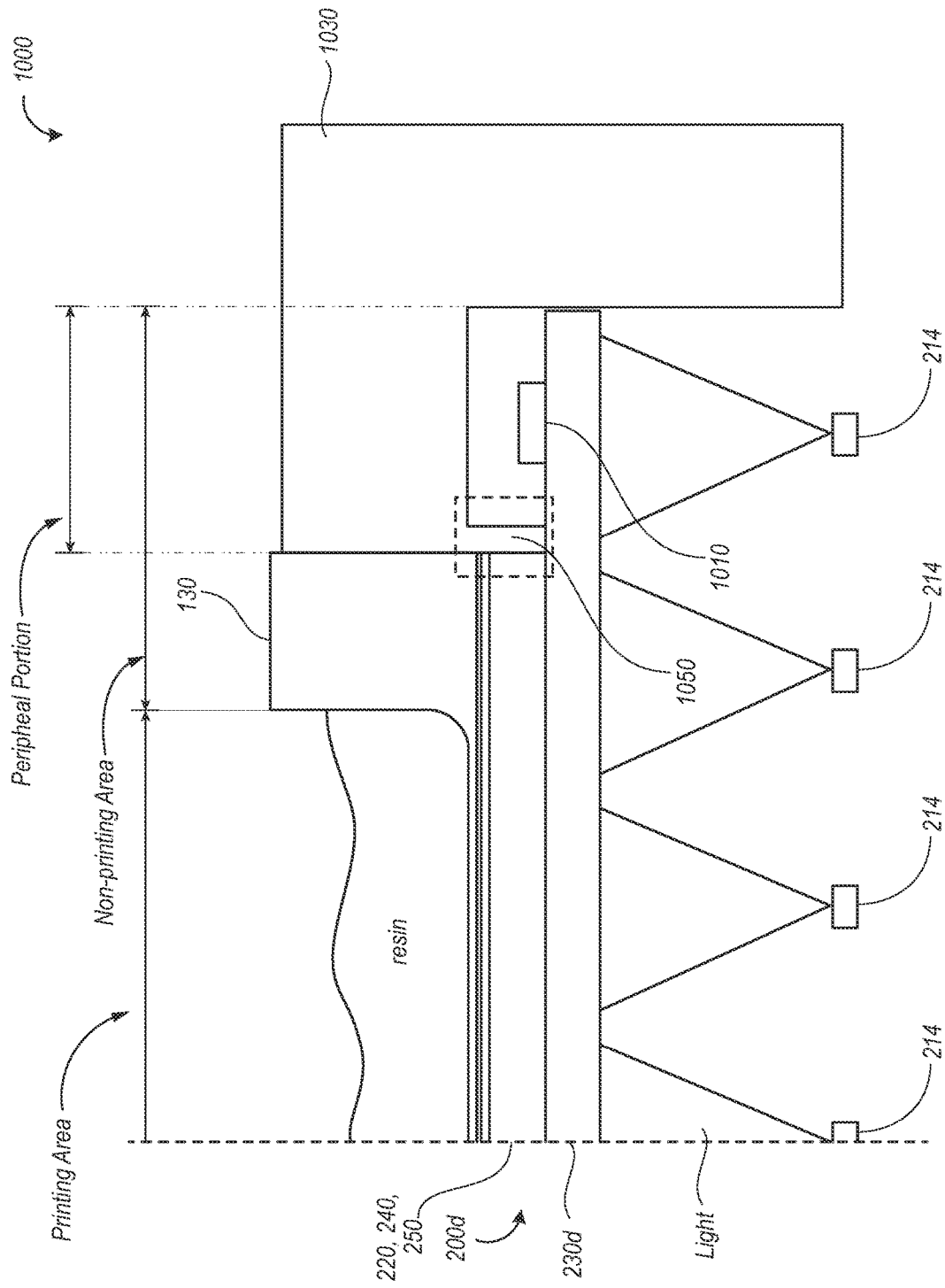
FIG. 10 is a schematic partial sectional view of UV light measurement system.

FIG. 10 shows a schematic partial sectional view of a system 1000 that is configured to measure the UV light exposure on the first polarizer 230d. As discussed previously, the first polarizer 230d degrades with exposure to the UV light generated by the light unit 210. As shown, the system 1000 includes one or more light sensors 1010 (e.g., photodiodes or UV light detectors) that are configured to measure the amount of the UV light (e.g., UV light intensity measurement in mW/cm$^2$) the first polarizer 230 is receives from the light unit 210. In some implementations, as shown, the light sensors 1110 are located at the surrounding or peripheral portion of the liquid crystal panel 200. In some implementations, to increase the accuracy of the UV light exposure measurement for the first polarizer 230d, the second polarizer 240, the liquid crystal cell 220, and the glass layers 250 may be removed or etched off at the peripheral portion of the liquid crystal panel 200d and one or more light sensors 1010 are disposed on a peripheral portion of the first polarizer 230d. In some implementations, to increase the accuracy of the UV light exposure measurement, the length and width of the second polarizer 240, the liquid crystal cell 220, and the glass layers 250 may be smaller than the length and width of the first polarizer 230d to provide sufficient space to place the light sensors 1010 at the peripheral portion of the liquid crystal panel 200d. To further increase the accuracy of the UV light exposure measurement, the light sensor 1010 can be covered with a cover or shroud 1030 that is capable of blocking ambient UV light from external sources (e.g., sunlight). In some implementation, to increase the accuracy of the UV light exposure measurement, a side wall member 1050 is disposed between the light sensor 1010 and the end surface of at least one of the second polarizer 240, the liquid crystal cell 220, and the glass layers 250 to prevent the lateral intrusion of the UV light. As shown, the side wall member 1050 is constructed with a suitable material that is capable of blocking the UV light from entering through the side surface of the at least one of the second polarizer 240, the liquid crystal cell 220, and the glass layers 250.

Figure 11:
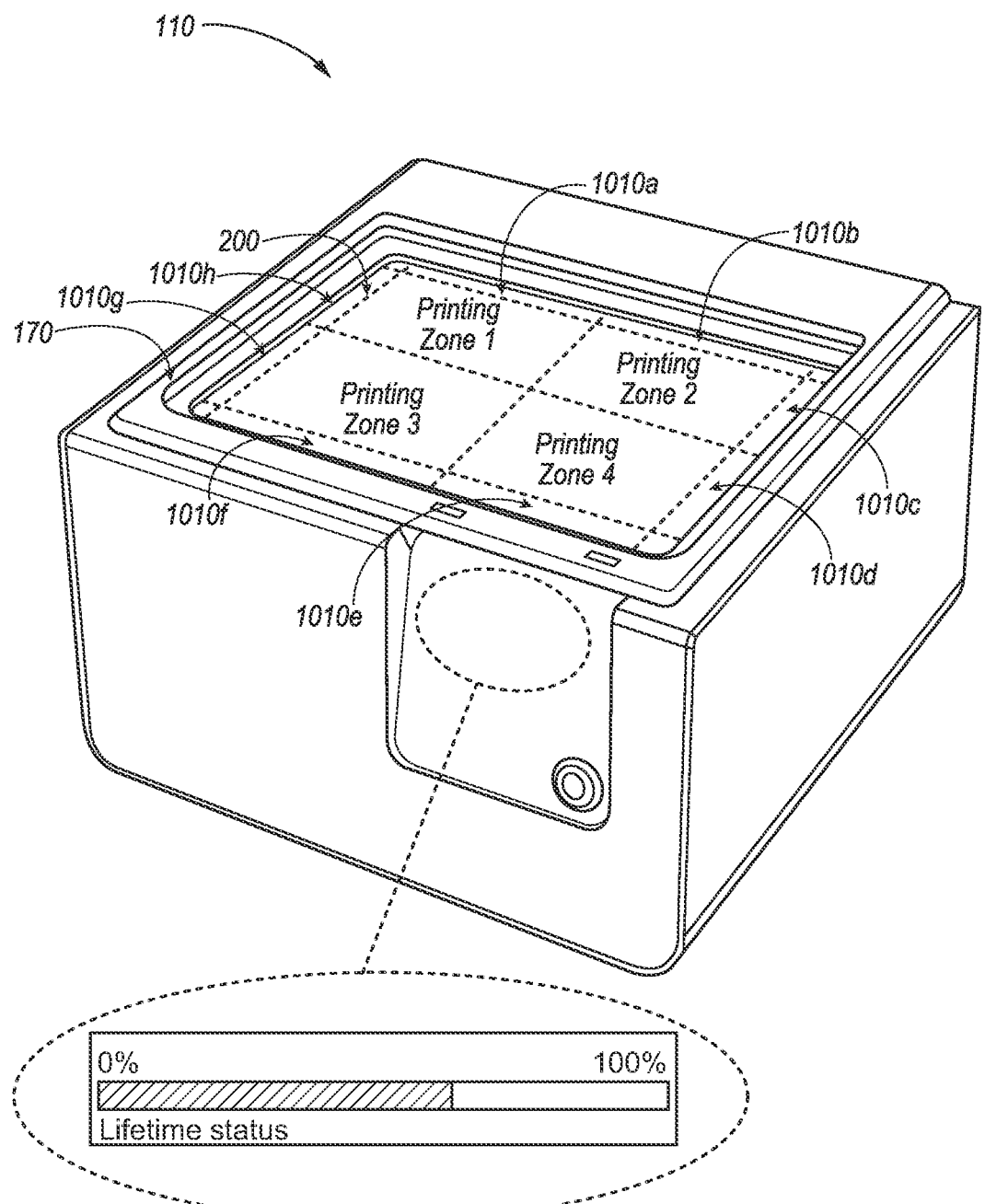
FIG. 11 shows a perspective view of an example base including a plurality of photodiodes.

Referring to FIG. 11, the base 110 of the printer 100 is illustrated without the dispensing system 120, the basin 130, and the build platform 140 to show various UV light intensity measurement locations for the light sensors 1010 (e.g., photodiodes or UV light detector). In some implementations, light sensors 1010, 1010a-1010h are located or disposed at the peripheral portion of the liquid crystal panel 200. The UV light measurements (e.g., UV light intensity measurement in mW/cm$^2$) collected by each of the light sensors 1010 are transmitted to the computing system 150 including the data processing hardware 152 and the memory hardware 154. In some implementations, the amount of the UV light the first polarizer 230 is exposed to is determined using the data processing hardware 152 based on the UV light intensity measurements collected by the light sensors 1010 and corresponding light unit on-time (e.g., UV light intensity measurements (mW/cm$^2$)×corresponding light unit on-time).

As shown in FIG. 11, the eight light sensors 1010a-1010h are disposed or located at the peripheral portion of the liquid crystal panel 200d. However, the present disclosure does not limit the location and the number of the light sensors 1010 implemented to measure the amount of the UV light transmitted to the first polarizer 230d. For example, more than eight light sensors 1010 are disposed or installed to measure the amount of the UV light the first polarizer 230d is exposed to at various locations. However, less than eight light sensors 1010 may disposed or installed to measure the amount of the UV light the first polarizer 230d is exposed to. In addition, one or more light sensors 1010 may be installed within the printing area (e.g., printing zones 1-4) or along the border between the printing area and the non-printing area.

It is helpful to have multiple light sensors 1010 to increase accuracy of the measurements. For example, the data processing hardware 152 is configured to determine or compute the amount of the UV light the first polarizer 230d is exposed to by averaging the UV light intensity measurements collected by the light sensors 1010 and monitoring the corresponding time the first polarizer 230d is exposed to the UV light (e.g., average of the UV light intensity measurements (mW/cm$^2$)×corresponding light unit on-time). Each of the UV light measurements is stored in the memory hardware 154 and accessed by the data processing hardware 152 is to determine the UV light determine the total amount of the UV light the first polarizer 230d is exposed to.

In some implementations, each of the light sensors 1010a-1010h is assigned to a corresponding printing zone (e.g., printing zones 1-4). For example, the light sensors 1010a, 1010*h* adjacent to the printing zone 1 are assigned to the printing zone 1. The light sensors 1010*b*, 1010*c* adjacent to the printing zone 2 are assigned to the printing zone 2. The light sensors 1010*g*, 1010*f* adjacent to the printing zone 3 are assigned to the printing zone 3. The light sensors 1010*d*, 1010*e* adjacent to the printing zone 4 are assigned to the printing zone 4.

In some instances, the data processing hardware 152 is configured to determine or compute the amount of UV light the first polarizer 230*d* is exposed to for each of the printing zones using the measurement collected by the assigned light sensors 1110. For example, the data processing hardware 152 is configured to determine the amount of UV light the printing zone 1 of the first polarizer 230*d* is exposed to by averaging the UV light measurements collected by the light sensors 1010*a*, 1010*h* associated with the printing area 1 and monitoring the corresponding time the printing area 1 of the first polarizer 230*d* is exposed to the UV light (e.g., average of the UV light intensity measurements (mW/cm$^2$) collected by assigned light sensors×corresponding light unit on-time). In these instances, the data processing hardware 152 is configured to add each of the UV light measurements together for a given printing zone.

In some implementations, the data processing hardware 152 is configured to determine or compute the amount of the UV light the first polarizer 230*d* is exposed to by selecting the greatest UV light measurement among the measurements collected by the light sensors 1010. This method can be used for conservatively determining the amount of the UV light transmitted to the first polarizer 230*d* or a printing zone of the first polarizer 230. Conversely, where a user desires to maximize the lifespan of the first polarizer, the data processing hardware 152 may configured to determine or compute the amount of the UV light the first polarizer 230*d* is exposed to by selecting the lowest UV light measurement among the measurements collected by the light sensor 1110.

The data processing hardware 152 is configured to compute or determine the total amount of the UV light that is exposed to the first polarizer 230*d* by adding all of the UV light measurements in accordance with some implementations. For example, the data processing hardware 152 is configured to compute or determine the total amount of UV light that is exposed to the most exposed area (e.g., printing zone 1).

In some implementations, the data processing hardware 152 is configured to display the total amount of the UV light that is exposed to the first polarizer 230*d* (or the most exposed area of the first polarizer 230*d* such as printing zone 1 as example) or the remaining lifetime of the first polarizer 230*d*. For example, as shown in FIG. 11, the display 162 of the control panel 160 may indicate the remaining lifetime of the first polarizer 230*d* based on the UV light measurements (e.g., average UV light intensity measurements (mW/cm$^2$) collected by the assigned light sensors in the most exposed area×corresponding light unit on-time) collected since installation or initialization of the first polarizer 230*d* and a predetermined or pre-computed amount of the UV light the first polarizer 230*d* can withstand before exceeding a known lifetime light exposure threshold for the first polarizer 230*d* (e.g., end of the lifetime). Based on the information on the display 162, the user can minimize maintenance and service costs only replacing the first polarizer 230*d* at predetermined maintenance interval. The data processing hardware 152 is further configured to reset the remaining lifetime to 100% and reset the UV light exposure computation when the first polarizer 230*d* is replaced.

A number of implementations have been described. Nevertheless, it will be understood that various modifications may be made without departing from the spirit and scope of the disclosure. Accordingly, other implementations are within the scope of the following claims.

What is claimed is:

1. A curing system for an additive fabrication system, the curing system comprising:
   a light source configured to emit light at a wavelength suitable for curing a photopolymerizable material;
   a liquid crystal cell configured to receive the light from the light source; and
   a first polarizer disposed between the light source and the liquid crystal cell, wherein the first polarizer comprises:
   a polyvinyl alcohol (PVA) matrix; and
   an organic dye impregnated into the PVA matrix.

2. The curing system of claim 1, wherein the wavelength of the light source is between 365 nm and 415 nm.

3. The curing system of claim 1, wherein the light source is configured to provide a flux greater than 20 mW/cm$^2$ at the first polarizer.

4. The curing system of claim 1, wherein the light source is configured to provide a flux greater than 2 mW/cm$^2$ at the photopolymerizable material.

5. The curing system of claim 1, wherein the first polarizer is configured to operate at a temperature range from 10 to 120 degrees Celsius.

6. The curing system of claim 1, wherein the organic dye comprises at least one dye made from one or more of metal diazo compounds, trisazo compounds, biphenyldiazo, trisazo or disazomonoazoxy compounds, or metal-containing biphenyldisazo, trisazo or disazomonoazoxy compounds.

7. The curing system of claim 1, wherein the first polarizer is spaced apart from the liquid crystal cell by a first distance.

8. The curing system of claim 1, wherein the first polarizer is laminated to the liquid crystal cell.

9. The curing system of claim 1, wherein the first polarizer is configured to be decoupled from the curing system.

10. The curing system of claim 1, wherein the light source comprises a high-power light emitting diode.

11. The curing system of claim 1, wherein a light-receiving surface of the liquid crystal cell has a size equal to or greater than a size of a light-emitting surface of the first polarizer.

12. The curing system of claim 1, further comprising a collimating lens between the light source and the first polarizer.

13. The curing system of claim 1, further comprising a diverging lens between the first polarizer and the liquid crystal cell.

14. The curing system of claim 1, further comprising a second polarizer situated on an opposite side of the liquid crystal cell compared to the first polarizer.

15. The curing system of claim 14, wherein the second polarizer comprises a second PVA matrix and an organic dye impregnated into the second PVA matrix.

16. The curing system of claim 14, wherein the second polarizer is spaced apart from the liquid crystal cell by a second distance.

17. The curing system of claim 14, wherein the second polarizer is laminated on the liquid crystal cell.

18. The curing system of claim 14, wherein the second polarizer is configured to be decoupled from the curing system.

19. A method of additive fabrication, the method comprising:
- emitting, from a light source, light at a wavelength suitable for curing a photopolymerizable material;
- receiving the light at a liquid crystal cell; and
- polarizing the light at a first polarizer disposed between the light source and the liquid crystal cell, wherein the first polarizer comprises:
  - a polyvinyl alcohol (PVA) matrix; and
  - an organic dye impregnated into the PVA matrix.

20. The method of claim 19, further comprising:
- polarizing the light at a second polarizer disposed on an opposite side of the liquid crystal cell as the first polarizer, wherein the second polarizer comprises:
  - a PVA matrix; and
  - an organic dye impregnated into the PVA matrix.

* * * * *